(12) United States Patent
Nielsen et al.

(10) Patent No.: US 12,450,891 B2
(45) Date of Patent: Oct. 21, 2025

(54) IMAGE CLASSIFIER COMPRISING A NON-INJECTIVE TRANSFORMATION

(71) Applicant: Robert Bosch GmbH, Stuttgart (DE)

(72) Inventors: Didrik Nielsen, København K (DK); Emiel Hoogeboom, Amsterdam (NL); Kaspar Sakmann, Stuttgart (DE); Max Welling, Amsterdam (NL); Priyank Jaini, Amsterdam (NL)

(73) Assignee: ROBERT BOSCH GMBH, Stuttgart (DE)

( * ) Notice: Subject to any disclaimer, the term of this patent is extended or adjusted under 35 U.S.C. 154(b) by 1168 days.

(21) Appl. No.: 17/345,702

(22) Filed: Jun. 11, 2021

(65) Prior Publication Data
US 2022/0012549 A1    Jan. 13, 2022

(30) Foreign Application Priority Data

Jul. 3, 2020    (EP) .................................. 20183862

(51) Int. Cl.
*G06V 10/82*    (2022.01)
*G06F 18/211*    (2023.01)
(Continued)

(52) U.S. Cl.
CPC ............ *G06V 10/82* (2022.01); *G06F 18/211* (2023.01); *G06F 18/2155* (2023.01);
(Continued)

(58) Field of Classification Search
CPC .. G06V 10/82; G06V 10/7715; G06V 10/776; G06V 10/764; G06F 18/211;
(Continued)

(56) References Cited

U.S. PATENT DOCUMENTS 9,014,432 B2 *    4/2015   Fan ..................... G06V 20/63
                                                      382/105
11,475,280 B2 *  10/2022   Riemenschneider .. G06N 3/045
                                (Continued)

FOREIGN PATENT DOCUMENTS

CN        111311553 A   *   6/2020
JP        2011145951 A       7/2011
                         (Continued)

OTHER PUBLICATIONS

Gambardella et al., Transflow Learning: Repurposing Flow Models Without Retraining, May 12, 2019, University of Oxford, pp. 1 & 7 (Year: 2019).*

(Continued)

*Primary Examiner* — David Yi
*Assistant Examiner* — Syed Rayhan Ahmed
(74) *Attorney, Agent, or Firm* — NORTON ROSE FULBRIGHT US LLP

(57) ABSTRACT

A computer-implemented method of training an image classifier which uses any combination of labelled and/or unlabelled training images. The image classifier comprises a set of transformations between respective transformation inputs and transformation outputs. An inverse model is defined in which for a deterministic, non-injective transformation of the image classifier, its inverse is approximated by a stochastic inverse transformation. During training, for a given training image, a likelihood contribution for this transformation is determined based on a probability of its transformation inputs being generated by the stochastic inverse transformation given its transformation outputs. This likelihood contribution is used to determine a log-likelihood for the training image to be maximized (and its label, if the training image is labelled), based on which the model parameters are optimized.

18 Claims, 5 Drawing Sheets

(51) Int. Cl.
*G06F 18/214* (2023.01)
*G06F 18/2415* (2023.01)
*G06F 18/2431* (2023.01)
*G06F 18/25* (2023.01)
*G06N 3/048* (2023.01)
*G06N 3/08* (2023.01)
*G06V 10/764* (2022.01)
*G06V 10/77* (2022.01)
*G06V 10/776* (2022.01)

(52) U.S. Cl.
CPC ...... *G06F 18/2415* (2023.01); *G06F 18/2431* (2023.01); *G06F 18/25* (2023.01); *G06N 3/048* (2023.01); *G06N 3/08* (2013.01); *G06V 10/764* (2022.01); *G06V 10/7715* (2022.01); *G06V 10/776* (2022.01)

(58) Field of Classification Search
CPC .. G06F 18/25; G06F 18/2155; G06F 18/2415; G06F 18/2431; G06N 3/048; G06N 3/08
See application file for complete search history.

(56) References Cited

U.S. PATENT DOCUMENTS

| | | | |
|---|---|---|---|
| 2006/0088207 A1* | 4/2006 | Schneiderman | G06F 18/24155 382/228 |
| 2013/0082858 A1* | 4/2013 | Chambers | G06N 99/00 342/22 |
| 2014/0270495 A1* | 9/2014 | Tu | G06F 18/2155 382/160 |
| 2017/0316281 A1 | 11/2017 | Criminisi et al. | |
| 2017/0372193 A1* | 12/2017 | Mailhe | G06N 3/084 |
| 2018/0068654 A1* | 3/2018 | Cui | G10L 15/075 |
| 2019/0042911 A1* | 2/2019 | Koren | G06N 3/04 |
| 2021/0209388 A1* | 7/2021 | Ciftci | G06N 3/045 |
| 2021/0256391 A1* | 8/2021 | Karlinsky | G06V 10/82 |
| 2022/0301714 A1* | 9/2022 | Kim | A61B 6/032 |
| 2023/0154055 A1* | 5/2023 | Besenbruch | H04N 19/13 375/240.03 |

FOREIGN PATENT DOCUMENTS

| | | |
|---|---|---|
| JP | 2018513507 A | 5/2018 |
| JP | 2019520655 A | 7/2019 |
| JP | 2019159576 A | 9/2019 |
| JP | 2020052936 A | 4/2020 |

OTHER PUBLICATIONS

Chen et al., Multi-view Generative Adversarial Network, Apr. 17, 2019, UPMC University (Year: 2019).*
Liu et al., Conditional Adversarial Generative Flow for Controllable Image Synthesis, Apr. 3, 2019, CUHK-SenseTime Joint Laboratory, Chinese University of Hong Kong (Year: 2019).*
Rezende et al., Variational Inference with Normalizing Flows, Jun. 14, 2016, Google DeepMind (Year: 2016).*
Donahue et al., Adversarial Feature Learning, Apr. 3, 2017, University of California Berkley (Year: 2016).*
Gomez et al., The Reversible Residual Network: Backpropagation Without Storing Activations, 2017, University of Toronto (Year: 2017).*
Stein et al., GeneSIS-RT: Generating Synthetic Images for training Secondary Real-world Tasks, 2018, ICRA (Year: 2018).*
Lange et al. (Learning With Constrained and Unlabelled Data) (Year: 2005).*
Nielsen, et al.: "SurVAE Flows: Surjections to Bridge the Gap between VAEs and Flows," arXIV:2007.02731v2 [cs.LG],(2020), XP0S1803489, pp. 1-25.
Rezende et al., "Variational Inference With Normalizing Flows," Cornell University, 2016, pp. 1-10. <https://arxiv.org/pdf/1505.05770.pdf> Downloaded Jun. 10, 2021.
Kingma, et al., "Auto-Encoding Variational Bayes," Cornell University Library, 2014, pp. 1-14. <https://arxiv.org/pdf/1312.6114.pdf> Downloaded Jun. 10, 2021.
Kingma et al., "ADAM: a Method for Stochastic Optimization," Cornell University, 2017, pp. 1-15. <https://arxiv.org/pdf/1412.6980.pdf> Downloaded Jun. 10, 2021.
Vaswani et al., "Attention is All You Need," Cornell University, 2017, pp. 1-15. <https://arxiv.org/pdf/1706.03762.pdf> Downloaded Jun. 10, 2021.
Gomez et al., "The Reversible Residual Network: Backpropagation Without Storing Activations," Cornell University, 2017, pp. 1-15. <https://arxiv.org/pdf/1707.04585.pdf> Downloaded Jun. 10, 2021.
Finzi et al., "Invertible Convolutional Networks," First Workshop On Invertible Neural Networks and Normalizing Flows (ICML), 2019, pp. 1-6. <https://invertibleworkshop.github.io/INNF_2019/accepted_papers/pdfs/INNF_2019_paper_26.pdf> Downloaded Jun. 10, 2021.

* cited by examiner

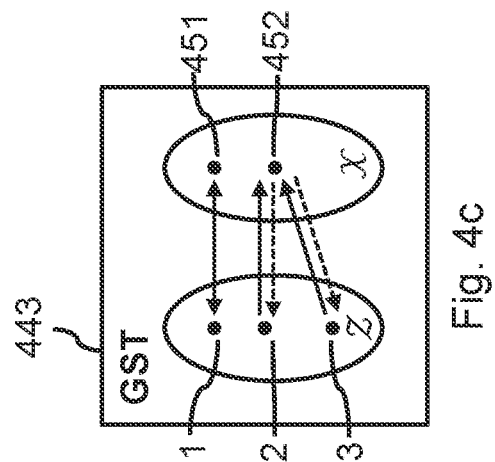
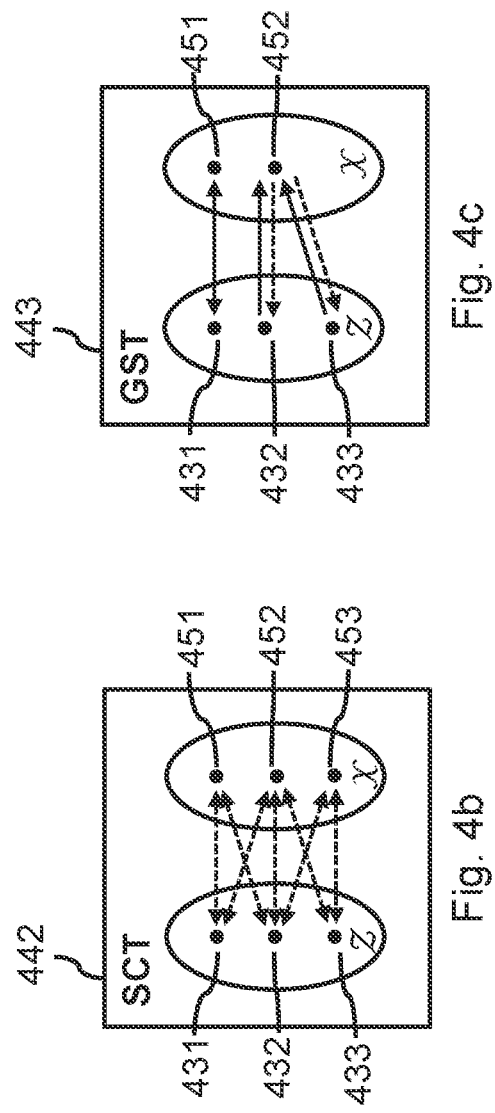
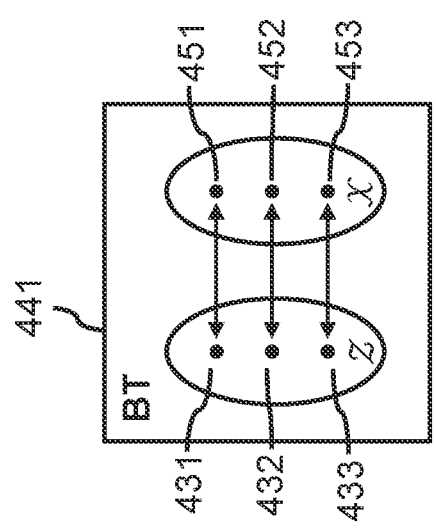
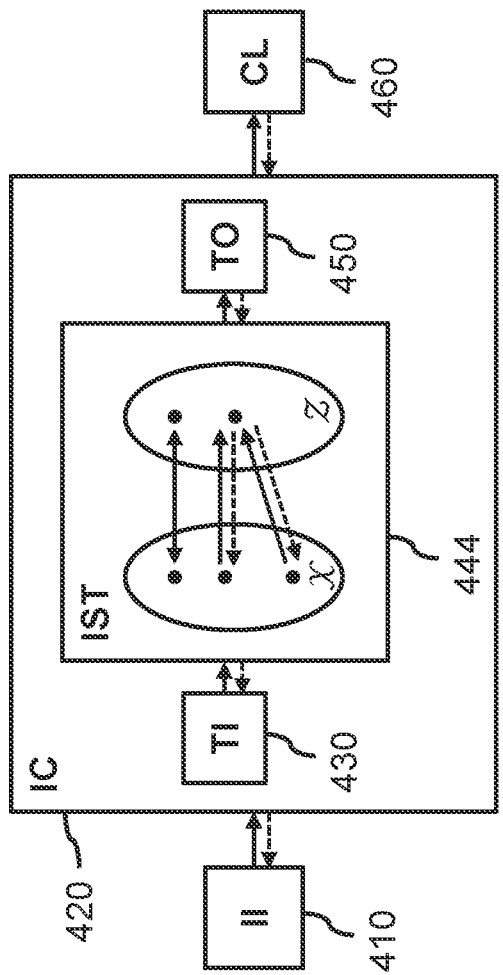
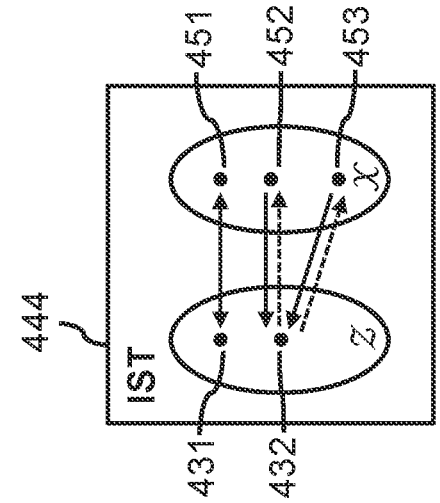

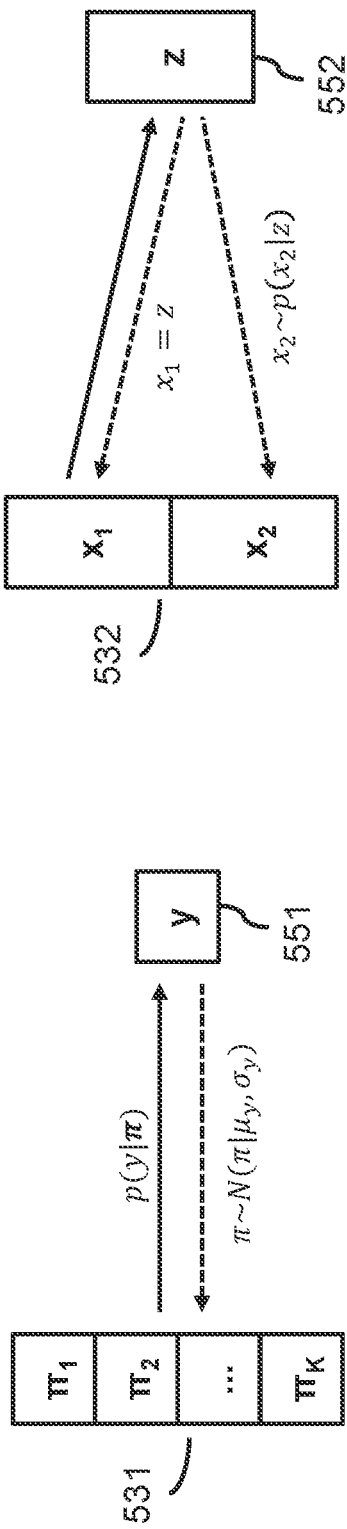
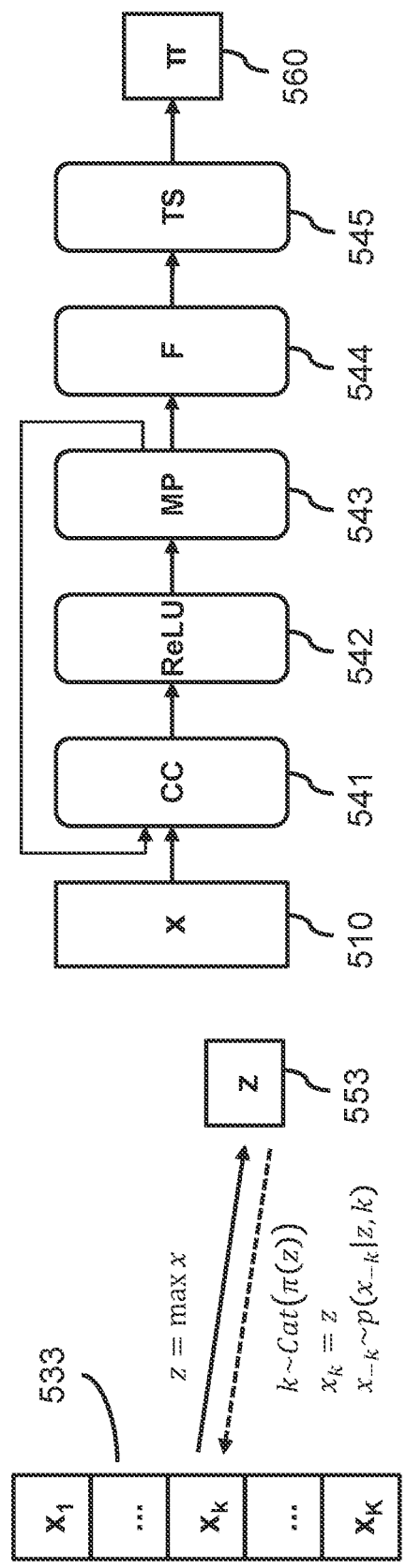
Fig. 5a
Fig. 5b
Fig. 5c
Fig. 5d

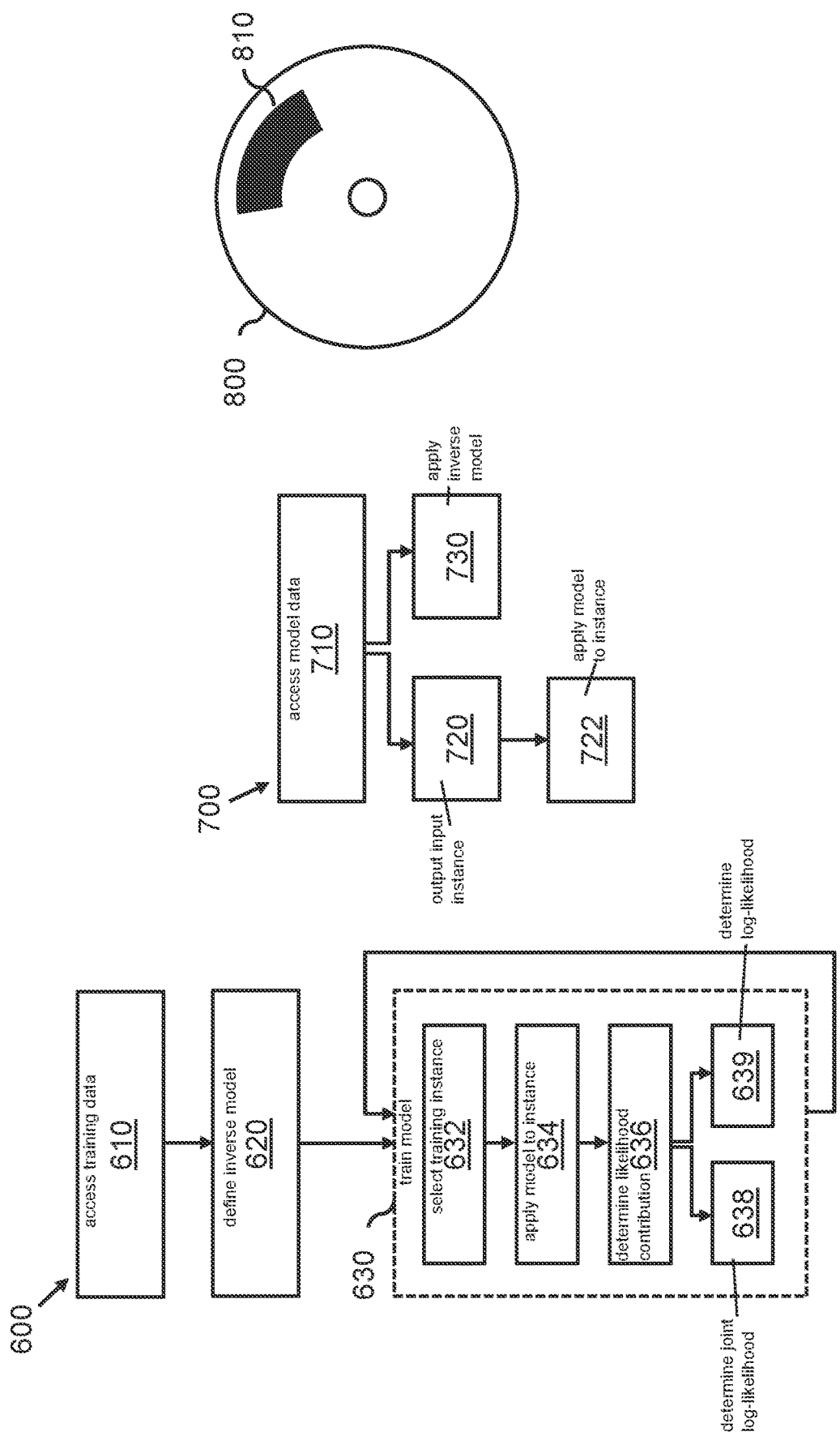

IMAGE CLASSIFIER COMPRISING A NON-INJECTIVE TRANSFORMATION

CROSS REFERENCE

The present application claims the benefit under 35 U.S.C. § 119 of European Patent Application No. EP 20183862.0 filed on Jul. 3, 2020, which is expressly incorporated herein by reference in its entirety.

FIELD

The present invention relates to a computer-implemented method of training an image classifier, and to a corresponding system. The present invention also relates to a computer-implemented method of using a trained image classifier for image classification and/or image generation, and to a corresponding system. The present invention further relates to a computer-readable medium comprising instructions to perform one of the above methods and/or model data representing a trained image classifier.

BACKGROUND INFORMATION

A vital task in many computer-controlled systems is image classification, in which an input image is to be classified into a class from a given set of classes. Image classification tasks arise for example in control systems of (semi-)autonomous vehicles, for example to extract useful information about a traffic scene in which the vehicle is operating. Image classification also has applications in manufacturing, healthcare, etcetera.

For many practical image classification problems, it turns out that machine learning techniques are very suitable. When using machine learning, classification is performed by applying a parameterized model to the input image. The model is trained to learn values for the set of parameters that lead to the best classification results. This training is typically supervised training based on a training dataset of labelled training images labelled with respective training classes from the given set of classes.

In particular, machine learning techniques from the area of deep learning have been found to work well in practice. Generally, an image classifier can take the form of a categorical distribution $p(y|x)=Cat(y|\pi(x))$ where x is the input image and y is the label. When using deep learning, x is typically mapped deterministically to class probabilities $\pi$ using a convolutional neural network comprising, convolutional layers, pooling layers, and/or densely-connected layers.

Although machine learning, and deep learning in particular, can give good results, there are also some practical problems. In order to reach satisfactory performance, typically a large amount of training data is needed. Moreover, this training data needs to be labelled, for example, manually. In many cases, it hard to obtain enough training data, and in some cases collecting such data can even be dangerous (e.g., in autonomous driving applications) or otherwise infeasible. Moreover, manually labelling all the training data is in many cases prohibitively expensive.

SUMMARY

It would be desirable to have an image classifier that can be trained in a semi-supervised way, using labelled training images with corresponding training classes, but also unlabelled training images for which no class is known. It would also be desirable to be able to use the image classifier to generate additional images similar to those in the training dataset, for example, in a class-conditional manner. Being able to class-conditionally generate additional images is especially desirable in situations where little labelled training data is available, for example because it allows to generate more samples of corner cases for which data would be otherwise hard to collect (e.g., dangerous traffic scenes).

In accordance with a first aspect of the present invention, a computer-implemented method and a corresponding system are provided for training an image classifier. In accordance with a further aspect of the present invention, a computer-implemented method and a corresponding system are provided for using such an image classifier to classify and/or generate images. In accordance with an aspect of the present invention, a computer-readable medium is provided.

As the inventors realized, both the training of an image classifier in a semi-supervised way, and the use of an image classifier to generate additional input, may be enabled by defining an inverse model for the image classifier, in other words, a model that maps output classes y of the image classifier to input images x.

As discussed in more detail below, given such an inverse model, a joint probability distribution $p(x,y)$ of input images and classes determined by the image classifier may be defined. Accordingly, labelled training images can be used to train the image classifier by maximizing a log-likelihood of the labelled training image occurring according to that joint probability distribution. Interestingly, however, the inverse model also allows to define a probability distribution $p(x)$ of images being generated by the inverse model. Thus, also unlabelled training images can be used to train the inverse model and thereby indirectly also the image classifier itself, by maximizing a log-likelihood of the unlabelled training image occurring according to the probability distribution $p(x)$. Thus, training of the image classifier based on any combination of labelled and/or unlabelled training images is enabled, in particular enabling semi-supervised learning of the image classifier.

Moreover, as also discussed in more detail below, defining the inverse model for the image classifier enables the image classifier to be used as a class-conditional generative model, e.g., according to the probability distribution $p(x|y)$. It is also possible to generate images independent of the class by sampling from the probability distribution $p(x)$. Since the inverse model corresponds to the image classification model and accordingly shares a lot of its trainable parameters with the forward mapping from images to classes, very representative images are generated.

Apart from this, in the classification direction, the use of a classifier that represents the joint probability distribution $p(x,y)$ and not just the conditional probability distribution $p(y|x)$ is believed to increase robustness to perturbations. Training may also be more efficient than separately training a generative model, and overfitting may be reduced. The class-conditional generator can directly generate images from a given class and as such is more efficient than, e.g., rejection sampling-type approaches for class-conditional generation. Images may also be generated according to a given vector of class probabilities rather than a given class, or more generally, according to specified values at an internal layer of the model, thereby enabling to customize the image generation, e.g., to generate images that are close to a decision boundary and/or that combine several characteristics.

In the context of generative modelling, it is conventional to use models for which an inverse model can be defined, e.g., using the so-called "normalizing flows" framework. In this framework, probability densities are represented via differentiable bijections with a differentiable inverse. Such a bijective function contributes to log-likelihoods of probability distributions in the form of the Jacobian determinant of the function.

Unfortunately, however, the normalizing flows framework cannot be applied to image classifiers. The bijective nature of the transformations used in normalizing flows limit their ability to, e.g., alter dimensionality as needed for image classification. In particular, an image classifier is not a bijective function. Namely, it can map multiple different input images to the same class. An image classifier may be regarded as being composed of multiple transformations between respective transformation inputs and transformation outputs. Some of these transformations may be bijective functions. However, an image classifier typically also contains one or more transformations that are non-injective, and accordingly, do not have a deterministic inverse. For example, this includes dimensionality-reducing layers such as max pooling and densely-connected layers that are commonly used in image classifiers. These layers thus cannot be modelled in the normalizing flows.

Interestingly, the inventors realized that it is still possible to define an inverse model for an image classifier, namely, by approximating an inverse of a non-injective transformation $f: \mathcal{X} \to \mathcal{Z}$ occurring in it, by a stochastic inverse transformation $g: \mathcal{Z} \to \mathcal{X}$. Thus, g may not define a function but may instead define a conditional probability distribution $p(x|z)$ for transformation inputs x given transformation outputs z. This inverse transformation may be an inverse in the sense that, given a transformation output z, the support of the defined probability distribution is limited to transformation inputs x that map to the transformation output. For example, if $p(x|z) \neq 0$ then $f(x)=z$. (This property may also be slightly relaxed, e.g., by only considering probabilities $p(x|z)$ above a certain threshold and/or demanding that $f(x)$ approximates z with a given tolerance.) Thus, the inverse transformation may be a right inverse in the sense that first applying the inverse and then applying the forward transformation, corresponds to the identity map.

As further discussed below, various transformations used in image classification may be implemented using such deterministic transformations with stochastic inverses. For example, the image classifier may comprise max pooling, ReLU, and/or dimension-reducing densely connected layers implemented using such transformations.

By combining (approximated) inverses of respective transformations, a stochastic inverse model for the image classifier may be obtained. The image classifier can be a deterministic function $y=f(x)$, or more generally, it can be a probability distribution $p(y|x)$ of the class given the input image. The inverse model may be an inverse in the sense that if $p(x|y) \neq 0$ then $f(x)=y$, or at least, $p(y|x) \neq 0$. In that sense it may be regarded as a right inverse of the image classifier, or at least an approximation to the right inverse.

The inventors found a particularly appealing way to use the inverse model to determine log-likelihoods for labelled as well as unlabelled training images. Namely, the inventors realized that the difference between log marginal densities of transformation outputs log p(z) and transformation inputs log p(x) of a deterministic, non-injective transformation $f(x)$, may be approximated by a likelihood contribution, which is based on the probability $p(x|z)$ of the transformation inputs x being generated by the stochastic inverse transformation given the transformation outputs z. This difference between the log marginal densities can then be used to compute both the joint log-likelihood log p(x,y) for labelled training images, and the log-likelihood p(x) for unlabelled training images.

Thus, given a particular training image, a log-likelihood for that image can be evaluated in a Monte Carlo fashion by applying the classifier to obtain inputs and outputs of the transformation $f(x)$; using the inputs and outputs to compute the likelihood contribution; and using the likelihood contribution to compute a log-likelihood for the training image (with or without an associated label). By optimizing the parameters of the image classifier to maximize the log-likelihoods for labelled and/or unlabelled training examples, the image classifier can be trained to learn the distribution of training input images as well as any available labels. Thus, any combination of unsupervised, semi-supervised or fully supervised training can be performed using the provided techniques.

In fact, the inventors realized that a likelihood contribution term can be defined not just for deterministic, non-injective transformations, but for other types of transformation as well.

The inventors identified four types of transformations that may be used beneficially in the image classifier: 1) both the transformation and its inverse are deterministic (referred to herein as a "bijective transformation"); 2) both the transformation and its inverse are stochastic (referred to herein as a "stochastic transformation"); 3) the transformation is deterministic and its inverse is stochastic (referred to herein as a "inference surjective transformation", or "inference surjection"); or 4) the transformation is stochastic and its inverse is deterministic (referred to herein as a "generative surjective transformation", or "generative surjection"). As discussed above, a deterministic, non-injective transformation does not have a deterministic inverse and so is of the second type. The term "surjective" is used herein to mean non-injective, in contrast to bijections. A single inference/generative surjection may be referred to as a "layer". A composition of one or more bijective, surjective, and/or stochastic transformations may be referred to as a "flow".

The inventors realized that, for each of these four types of transformation, the difference between log marginal probabilities of transformation inputs and outputs may be approximated as a sum of a likelihood contribution term and a bound looseness term. For inference surjections and bijections the bound looseness term may be zero. For stochastic transformations and generative surjections, a non-zero bound looseness term may be defined representing a gap in evidence lower bound. Thus, log-likelihoods for training images may be determined by combining likelihood contributions for respective transformations of the set of transformations, e.g., by summing up likelihood contributions represented as log-differences (or multiplying likelihood contributions that do not use log). The result may be an approximation with closeness given by the bound looseness terms, that are typically not evaluated during training. Accordingly, the various types of transformations can be arbitrarily combined while still allowing log-likelihoods for training images to be efficiently computed.

Apart from being able to deal with non-injective transformations that reduce dimensionality, the use of various non-bijective transformations also allows improved modelling of discrete data and distributions with discrete structure or disconnected components, e.g., structures in images that involve disconnected components. Examples are provided herein.

As discussed, an image classifier typically comprises at least one inference surjection. For example, at least one inference surjection may be at an internal layer of the image classifier, e.g., it may be both preceded and succeeded by one or more other transformations. There can be inference surjections at multiple layers of the image classifier. For example, an input of an inference surjection may be determined by successively applying multiple other inference surjections and/or other transformations. For example, an output an inference surjection may be used to successively apply multiple other inference surjections and/or other transformations on. At least one bijective transformation may precede and/or succeed the inference surjection.

In an embodiment of the present invention, the image classifier can consist of just bijective and inference surjective transformations, apart from optionally using a stochastic output layer. This may result in an image classifier which is deterministic in the forward direction (apart from the output layer). This has the advantage of allowing efficient classification; many traditional image classifier models are of this kind.

However, it is also possible to use generative surjective and/or stochastic transformations; examples are provided herein. For example, various transformations are described herein that are particularly suitable for modelling symmetries and disconnected components in images, etcetera.

Generally, a transformation and/or its inverse may be parameterized by parameters that are learned when training the image classifier. This applies to inference surjective transformations but also to generative surjective, bijective, and stochastic transformations. (Transformations without parameters are also possible however.) The parameters of the transformation and its inverse in many cases partially overlap or even coincide. It is also possible for the set of parameters of the transformation to be a subset of the set of parameters of its inverse, or for the inverse to have parameters but the transformation itself not, etc. These latter cases are especially applicable for inference surjective transformations in which the transformation itself e.g. computes a deterministic function and the inverse uses the parameters to effectively guess transformation inputs given transformation outputs. It is noted that the likelihood contribution for an inference surjective transformation typically uses the parameters of the inverse (and these parameters are thus trained) even if they are not used when applying the classifier.

Various building blocks that are conventional in image classification, may be implemented using deterministic, non-injective transformations. Several examples are described below, that can be arbitrarily combined as needed for a particular application. As is common in image classification, for various transformations the inputs and/or output may be represented as three-dimensional volumes comprising one or more channels. At each channel, the input image may be represented in a two-dimensional way, typically keeping a degree of spatial correspondence between the representation and the input image.

Optionally, the image classifier may comprise a dimensionality-reducing densely connected component implemented using a linear bijective transformation and a slicing transformation. The linear bijective transformation may apply dimensionality-preserving linear transformation. The slicing transformation may then select a subset of the outputs of the linear bijective transformation. Interestingly, any dimensionality-reducing linear transformation can be represented in this way. After (or alternatively, before) applying the slicing, an activation function may be applied, e.g., a non-linear bijective function or an inference surjections such as a ReLU as described herein.

The slicing transformation is a deterministic, non-injective transformation since it reduces dimensionality. Its inverse may be approximated in the inverse model by a stochastic inverse transformation. The inverse transformation may sample non-selected outputs for the linear bijective transformation given the selected outputs of the linear bijective transformation, e.g., while keeping the non-selected outputs intact. Optionally, the inverse transformation may be parameterized, and may thus effectively learn to impute the non-selected outputs given the selected outputs.

Optionally, the image classifier may include a convolutional coupling transformation. This is a coupling layer in which the functions that are applied, are convolutions. In a coupling layer, first and second transformation outputs $y_1$, $y_2$ are determined given first and second transformation inputs $x_1$, $x_2$ by combining the first transformation input with a first function of the second transformation input to get a first transformation output, e.g., $y_1=x_1+\mathcal{F}(x_2)$, and combining the second transformation input with a second function of the first transformation output, e.g., $x_2+\mathcal{G}(y_1)$ to get a second transformation output.

Typically, the first and second transformation inputs are subsets of channels of an input activation volume, and similarly, the first and second transformation outputs each provide one or more channels of an output activation volume. The transformations are applied convolutionally to their inputs, typically with stride 1 to provide invertibility.

Convolutions are useful for image classification; the use of coupling layers is particularly beneficial in the present setting since they are efficiently invertible without the need for a stochastic inverse for this transformation. A convolutional coupling transformation can optionally be followed by a slicing transformation to select a subset of channels of the output.

Optionally, the image classifier may include a maximum value transformation. The maximum value transformation may compute a transformation output as a maximum of multiple transformation inputs. This is another type of transformation often used in image classification. For instance, a max pooling layer may be implemented by applying the maximum value transformation convolutionally across an input volume. The maximum value transformation is a deterministic, non-injective transformation. In the inverse model, its inverse can be approximated by sampling an index of a maximal transformation input given the transformation output, and sampling values of non-maximal transformation inputs given the transformation output and the index of the maximal transformation input. Again, the inverse model may be parameterized to learn to make an optimal guess for the transformation input, but this is not needed.

Optionally, the image classifier may include a ReLU transformation computing a transformation output by mapping a transformation input from a given interval to a given constant, e.g., $z=\max(x,0)$ mapping inputs in the interval $[-\infty,0]$ to 0. Also this transformation is deterministic and non-injective. Its inverse may be approximated in the inverse model by an inverse transformation that, if the transformation output is equal to the given constant, samples a transformation input from the given interval.

Optionally, the image classifier may be configured to classify the input image into the class by determining a vector of class probabilities for respective classes, and, in an output layer, determining the class therefrom. This determining can be deterministic, e.g., selecting the most likely class, or probabilistically e.g., by sampling according to probability. In the inverse model, the inverse of the output layer can be approximated based on a conditional probability distribution for the vector of class probabilities given the determined class, typically with trainable parameters. This conditional probability distribution may also be used to determine the class based on the class probabilities, e.g., according to Bayes' rule. This provides a way of defining the output and its inverse with relatively few parameters in a principled manner.

Optionally, the image classifier may include a stochastic transformation with a deterministic inverse transformation, in other words, a generative surjective transformation. In this case, also a likelihood contribution may be computed, but now it may be based on a probability of the transformation outputs of the transformation being generated given the transformation inputs, instead of the other way round. Generative surjective transformations may be used to more accurately model various kinds of image data. For example, a generative rounding surjection as discussed herein may be used as an initial layer to effectively dequantize discrete image data to continuous values.

Interestingly, image classifiers trained according to the techniques presented herein, may be used not only to classify images, but also to generate additional images by using the inverse model. As noted above, the parameters of the transformations that make up the image classifier and of their inverses may not necessarily be the same. Accordingly, when using the classifier only to classify images, or only to generate images, only a respective subset of the parameters of the trained classifier may need to be accessed.

Specifically, the inverse model may be used as a class-conditional generative model by obtaining a target class, and applying the inverse model to generate an image representative of the target class. For example, based on the target class, a vector of class probabilities may be determined according to an inverse of output layer, as also discussed elsewhere. The vector of class probabilities may also be set arbitrarily to generate images that have a specified correspondence to multiple classes. It is also possible to first sample a target class and then sample an image from that class to obtain an image representative of the overall training dataset. Images generated by applying the inverse model can be used, for example, as training and/or test data to train a further machine learning model.

Optionally, the image classifier may be configured to determine a confidence score of a determined classification. Because of the training based on log-likelihoods, the confidence score may accurately represent a probability of the input image actually belonging to the determined class.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

FIG. 4a-4d show detailed examples of transformations, in accordance with an example embodiment of the present invention.

FIG. 4e shows a detailed example of a trained model, in accordance with an example embodiment of the present invention.

FIG. 5a shows a detailed example of an output layer, in accordance with an example embodiment of the present invention.

FIG. 5b shows a detailed example of a slicing transformation, in accordance with an example embodiment of the present invention.

FIG. 5c shows a detailed example of a maximum value transformation, in accordance with an example embodiment of the present invention.

FIG. 5d shows a detailed example of an image classifier, in accordance with an example embodiment of the present invention.

FIG. 6 shows a computer-implemented method of training a model, in accordance with an example embodiment of the present invention.

FIG. 7 shows a computer-implemented method of using a trained model, in accordance with an example embodiment of the present invention.

FIG. 8 shows a computer-readable medium comprising data, in accordance with an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
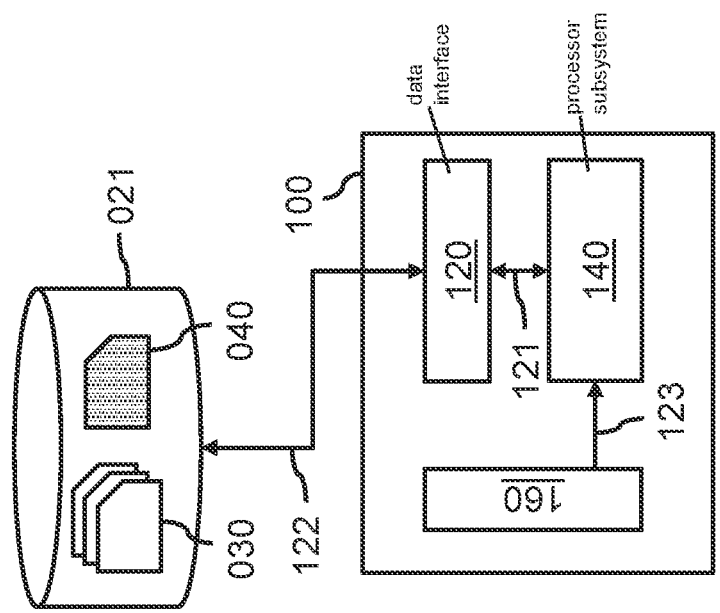
FIG. 1 shows a system for training a model, in accordance with an example embodiment of the present invention.

FIG. 1 shows a system 100 for training a model. The model may be configured to determine a model output given an input instance. In an embodiment, the input instance may be an image. In an embodiment, the model may be a classification model configured to classify the input instance into a class from a set of classes.

The system 100 may comprise a data interface 120 for accessing a training dataset 030. The training dataset 030 may comprise at least one labelled training instance (e.g., image) labelled with a training model outputs (e.g., a class from the set of classes). Instead or in addition, the training dataset 030 may comprise at least one unlabelled training instance (e.g., image). For example, the training dataset may comprise at least 1000, at least 100000, or at least 10000000 training instances. From the training instances, at most or at least 1%, at most or at least 5%, or at most or at least 10% may be labelled, for example.

As illustrated in the figure, data interface 120 may also be for accessing model data 040 representing the model being trained. In particular, the model data may comprise a set of parameters of the model that is being trained. For example, the model may comprise at least 1000, at least 10000, or at least 100000 trainable parameters. The model data may define a forward model for determining model outputs given input instances, and an inverse model for determining input instances from model outputs. The sets of parameters of the forward and inverse models typically overlap; they can coincide but this is not necessarily the case, e.g., the inverse model may comprise additional parameters. The trained model may be used to apply the model and/or generate input instances according to a method described herein, e.g., by system 200 of FIG. 2. Systems 100 and 200 may also be combined into a single system.

For example, as also illustrated in FIG. 1, the data interface 120 may be constituted by a data storage interface 120 which may access the data 030, 040 from a data storage 021. For example, the data storage interface 120 may be a memory interface or a persistent storage interface, e.g., a hard disk or an SSD interface, but also a personal, local or wide area network interface such as a Bluetooth, Zigbee or Wi-Fi interface or an ethernet or fibreoptic interface. The data storage 021 may be an internal data storage of the system 100, such as a hard drive or SSD, but also an external data storage, e.g., a network-accessible data storage. In some embodiments, the data 030, 040 may each be accessed from a different data storage, e.g., via a different subsystem of the data storage interface 120. Each subsystem may be of a type as is described above for data storage interface 120.

The system 100 may further comprise a processor subsystem 140 which may be configured to, during operation of the system 100, define an inverse model for the model, wherein the model comprises a set of transformations. The set of transformations may comprise at least one deterministic, non-injective transformation, whose inverse may be approximated in the inverse model by a stochastic inverse transformation. Instead or in addition, the set of transformations may comprise at least one stochastic transformation with a deterministic inverse transformation.

Processor subsystem 140 may be further configured to, during operation of the system 100, train the model using a log-likelihood optimization. During the optimization, a training instance may be selected from training dataset 030. The model 040 may be applied to the training instance. This may comprise determining transformation inputs to respective transformations based on the training image, and applying transformations to obtain respective transformation outputs.

For a deterministic, non-injective transformation, processor subsystem 140 may be configured to determine a likelihood contribution based on a probability of the transformation inputs of the transformation being generated by the stochastic inverse transformation given the transformation outputs of the transformation. For a stochastic transformation with a deterministic inverse, processor subsystem 140 may be configured to determine a likelihood contribution based on a probability of the transformation outputs of the stochastic transformation being generated by the transformation given the transformation inputs of the stochastic transformation.

System 100 may be configured for use of labelled training instances, in which case then processor subsystem 140 may be configured to, if the selected training instance is labelled, use the determined likelihood contribution to determine a log-likelihood for the labelled training instance and its label according to a joint probability distribution of input instances and outputs determined by the model.

System 100 may be configured for use, instead or in addition, of unlabelled training instances, in which case processor subsystem 140 may be configured to, if the selected training instance is unlabelled, use the determined likelihood contribution to determine a log-likelihood for the unlabelled training instance according to a probability distribution of input instances being generated by the inverse model.

The system 100 may further comprise an output interface for outputting model data 040 representing the learned (or 'trained') model. For example, as also illustrated in FIG. 1, the output interface may be constituted by the data interface 120, with said interface being in these embodiments an input/output ('IO') interface, via which the trained model data 040 may be stored in the data storage 021. For example, model data defining the 'untrained' model may during or after the training be replaced, at least in part, by the model data 040 of the trained model, in that the parameters of the model, such as weights and other types of parameters of neural networks, may be adapted to reflect the training on the training data 030. This is also illustrated by model data 040 in FIG. 1. In other embodiments, the trained model data 040 may be stored separately from the model data defining the 'untrained' model. In some embodiments, the output interface may be separate from the data storage interface 120, but may in general be of a type as described above for the data storage interface 120.

Figure 2:
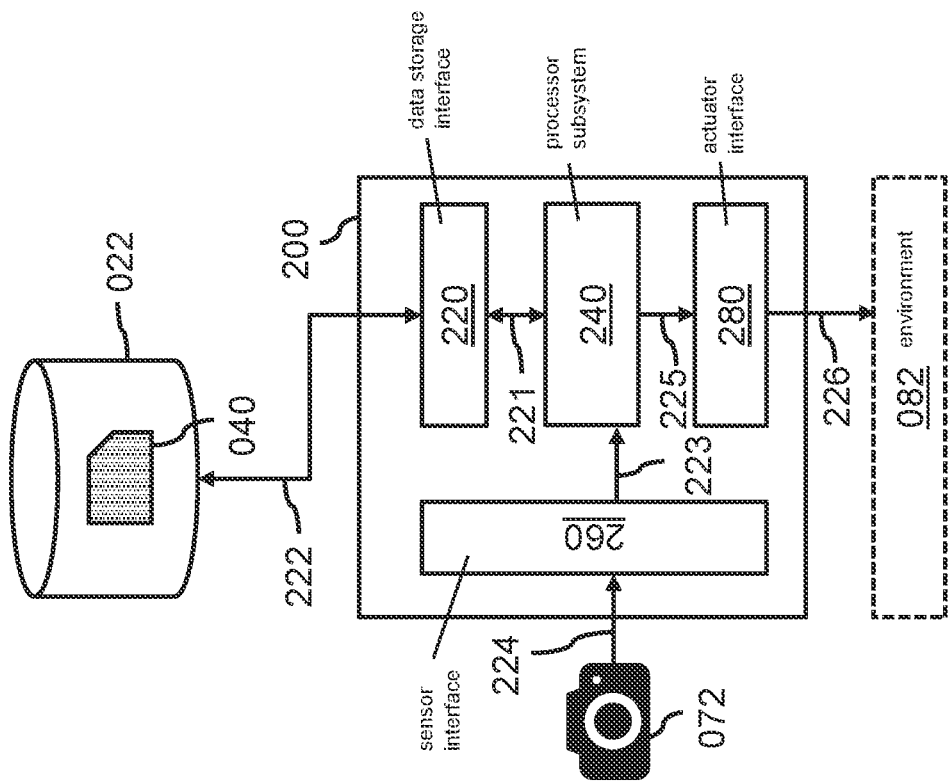
FIG. 2 shows a system for using a trained model, in accordance with an example embodiment of the present invention.

FIG. 2 shows a system 200 for using a trained model. The model may be configured to determine a model output given an input instance. In an embodiment, the input instance may be an image. In an embodiment, the model may be a classification model configured to classify the input instance into a class from a set of classes.

The system 200 may comprise a data interface 220 for accessing model data 040 representing the trained model, as may be determined by the system 100 of FIG. 1 or as described elsewhere. As also discussed with respect to FIG. 1, the model data may comprise parameters of forward transformations for determining model outputs from input instances and/or parameters of inverse transformations for determining input instances from model outputs; these parameters may partially overlap. System 200 may be configured for using the trained model to determine a model output, in which case model data 040 may comprise at least the parameters of the forward transformations, but not necessarily of the inverse transformations. Instead or in addition, system 200 may be configured for using the trained model to determine an input instance, in which case model data 040 may comprise at least the parameters of the inverse transformations.

For example, as also illustrated in FIG. 2, the data interface may be constituted by a data storage interface 220 which may access the data 040 from a data storage 022. In general, the data interface 220 and the data storage 022 may be of a same type as described with reference to FIG. 1 for the data interface 120 and the data storage 021. The data storage may optionally also comprise an input instance to which the model is to be applied, for example, comprising sensor data. The input instance may also be received directly from a sensor 072 via a sensor interface 260 of via another type of interface instead of being accessed from the data storage 022 via the data storage interface 220.

The system 200 may further comprise a processor subsystem 240 which may be configured to, during operation of the system 200, to use the trained model. This using can comprise obtaining an input instance and applying the model to determine a model input, e.g., to classify the input image into a class from the set of classes. Instead or in addition, using the model may comprise applying the inverse model to generate a synthetic instance. This can comprise sampling transformation inputs of a deterministic and non-injective transformation based on transformation outputs of said transformation according to a stochastic inverse transformation, for example. The determined model output or instance may be output using a data/output interface as described elsewhere.

It will be appreciated that the same considerations and implementation options apply for the processor subsystem 240 as for the processor subsystem 140 of FIG. 1. It will be further appreciated that the same considerations and implementation options may in general apply to the system 200 as for the system 100 of FIG. 1, unless otherwise noted.

FIG. 2 further shows various optional components of the system 200. For example, in some embodiments, the system 200 may comprise a sensor interface 260 for directly accessing sensor data 224 acquired by a sensor 072 in an environment 082. The input instance to which the model is applied, may be based on or comprise sensor data 224. The sensor may be arranged in environment 082 but may also be arranged remotely from the environment 082, for example if the quantity(s) can be measured remotely. The sensor 072 may but does not need to be part of the system 200.

The sensor 072 may have any suitable form, such as an image sensor, a lidar sensor, a radar sensor, a pressure sensor, a contain temperature sensor, etc. In this figure, a sensor for providing image data is shown, e.g., a video sensor, a radar sensor, a LiDAR sensor, an ultrasonic sensor, a motion sensor, or a thermal image sensor.

In some embodiments, the sensor data 072 may sensor measurements of different physical quantities in that it may be obtained from two or more different sensors sensing different physical quantities. The sensor data interface 260 may have any suitable form corresponding in type to the type of sensor, including but not limited to a low-level communication interface, e.g., based on I2C or SPI data communication, or a data storage interface of a type as described above for the data interface 220.

In some embodiments, the system 200 may comprise an actuator interface 280 for providing control data 226 to an actuator (not shown) in the environment 082. Such control data 226 may be generated by the processor subsystem 240 to control the actuator based on an output of applying the model and/or based on a generated input instance. The actuator may be part of system 200. For example, the actuator may be an electric, hydraulic, pneumatic, thermal, magnetic and/or mechanical actuator. Specific yet non-limiting examples include electrical motors, electroactive polymers, hydraulic cylinders, piezoelectric actuators, pneumatic actuators, servomechanisms, solenoids, stepper motors, etc. Such type of control is described with reference to FIG. 3 for an (semi-)autonomous vehicle.

In other embodiments (not shown in FIG. 2), the system 200 may comprise an output interface to a rendering device, such as a display, a light source, a loudspeaker, a vibration motor, etc., which may be used to generate a sensory perceptible output signal which may be generated based on a determined model output or generated input instance. For example, the signal may be, e.g., for use in guidance, navigation or other type of control of a computer-controlled system.

In still other embodiments (not shown in FIG. 2), the system 200 may comprise an output interface, e.g., as discussed with respect to FIG. 1, for outputting multiple input instances generated by applying the inverse model for use as training and/or test data to train a further machine learning model. For example, the input instances may be used as labelled data, or may optionally be labelled (e.g., manually) and used as labelled data. The input instances may also be used to refine model 040, e.g., system 200 may provide the generated instances (and optionally their labels) to system 100 for refining model 040.

In general, each system described in this specification, including but not limited to the system 100 of FIG. 1 and the system 200 of FIG. 2, may be embodied as, or in, a single device or apparatus, such as a workstation or a server. The device may be an embedded device. The device or apparatus may comprise one or more microprocessors which execute appropriate software. For example, the processor subsystem of the respective system may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the processor subsystem of the respective system may be implemented in the device or apparatus in the form of programmable logic, e.g., as a Field-Programmable Gate Array (FPGA). In general, each functional unit of the respective system may be implemented in the form of a circuit. The respective system may also be implemented in a distributed manner, e.g., involving different devices or apparatuses, such as distributed local or cloud-based servers. In some embodiments, the system 200 may be part of vehicle, robot or similar physical entity, and/or may be represent a control system configured to control the physical entity.

Various concrete applications for system 200 are envisaged. In an embodiment, system 200 may be used for glaucoma detection in images of (e.g., human) eyes. In an embodiment, system 200 may be used for fault detection in a manufacturing process based on images of manufactured products. In an embodiment, system 200 may be used to classify plants or weeds for determining fertilizer and pesticide needs.

Figure 3:
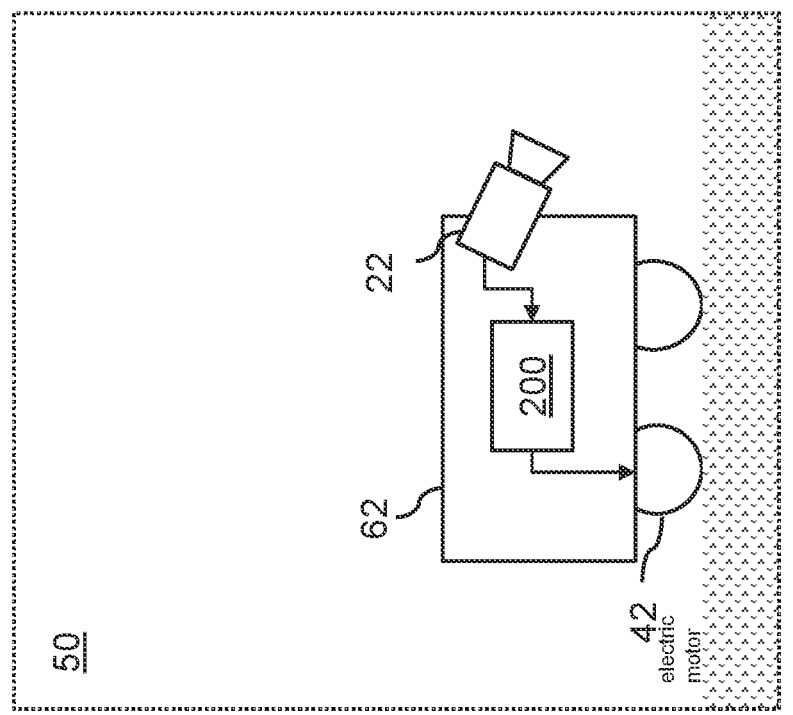
FIG. 3 shows a (semi-)autonomous vehicle using an image classifier, in accordance with an example embodiment of the present invention.

FIG. 3 shows an example of the above, in that the system 200 is shown to be a control system of an (semi-)autonomous vehicle 62 operating in an environment 50. The autonomous vehicle 62 may be autonomous in that it may comprise an autonomous driving system or a driving assistant system, with the latter also being referred to as a semiautonomous system. The trained model may in this case be an image classifier being applied to image data obtained from a video camera 22 integrated into the vehicle 62.

The autonomous vehicle 62 may for example incorporate the system 200 to control the steering and/or the braking of the autonomous vehicle based the image data. For example, the system 200 may control an electric motor 42 to perform (regenerative) braking in case the autonomous vehicle 62 is in a dangerous traffic situation, e.g., is expected to collide with a traffic participant. The system 200 may control the steering and/or braking, e.g., to avoid collision with the traffic participant. For that purpose, the system 200 may classify an image representing an environment of the vehicle 62 as being dangerous or non-dangerous, based on the image data obtained from the video camera.

As another example, system 200 may classify an input image, e.g., obtained from an ultrasonic sensor of vehicle 62, for performing near field object height classification. System 200 can also be used to perform free space detection in video data from camera 22, e.g., the trained model may be a semantic segmentation model in this case. More generally, detection by an image classifier of the presence of various types of objects in the environment of the vehicle, e.g., traffic signs, road surfaces, pedestrians, and/or other vehicles, may be used for various upstream tasks in controlling and/or monitoring the (semi-)autonomous vehicle, e.g., in a driving assistance system.

In (semi-)autonomous driving, collecting and labelling training data is expensive and can even be dangerous, and accordingly, being able to use unlabelled training data to train the image classifier and/or being able to generate additional synthetic training data is particularly advantageous.

Below, various techniques are demonstrated using image classification as the main application. As the skilled person understands, however, the provided techniques also generalize to other types of data, and the provided advantages (including improved semi-supervised learning, improved training of generative models, and improved ability to model certain types of datasets, e.g., discrete or symmetric data) also apply in those cases.

Various embodiments relate to trainable models (e.g., image classifiers), and their inverses. Such a trainable model may be constructed by composing one or more respective transformations between transformation inputs and transformation outputs.

Mathematically, let $\mathcal{X} \subseteq \mathbb{R}^{d_x}$ and $\mathcal{Z} \subseteq \mathbb{R}^{d_z}$ be two random variables. A transformation $f: \mathcal{Z} \to \mathcal{X}$ may be called a stochastic mapping if for each $z \in \mathcal{Z}$, $\mathcal{X}_{|z} := f(z)$ is a random variable with distribution $p(x|z)$, i.e. $x \sim p(x|z)$ where $x \in \mathcal{X}_{|z}$. Furthermore, $f$ may be called bijective if $\forall z \in \mathcal{Z}$, there exists a unique $x \in \mathcal{X}$ such that $x = f(z)$ and if $x_1 = f(z)$ and $x_2 = f(z)$, then $x_1 = x_2$.

In the context of generative modelling, the paper "Variational Inference with Normalizing Flows" by D. Rezende et al. (incorporated herein by reference and available at https://arxiv.org/abs/1505.05770) discusses normalizing flows. These make use of bijective transformations $f$ to transform a simple base density $p(z)$ to a more expressive density $p(x)$, making using the change-of-variables formula $p(x)=p(z) |\det \nabla_x f^{-1}(x)|$. Also in the context of generative modelling, the paper "Auto-Encoding Variational Bayes" by D. Kingma et al. (incorporated herein by reference and available at https://arxiv.org/abs/1312.6114) discusses variational autoencoders (VAE). VAEs define a probabilistic graphical model where each observed variable x has an associated latent variable z with the generative process as $z \sim p(z)$, $x \sim p(x|z)$, where $p(x|z)$ may be viewed as a stochastic transformation. VAEs use variational inference with an amortized variational distribution $q(z|x)$ to approximate the typically intractable posterior $p(z|x)$ which facilitates computation of a lower bound of $p(x)$ known as the evidence lower bound (ELBO), e.g., $\mathcal{L} := \mathbb{E}_{q(z|x)}[\log p(x|z)] - \mathbb{D}_{KL}[q(z|x) \| p(z)]$.

The inventors realized that it would be desirable to train and use models that contain both bijective and stochastic transformations. The inventors however also realized that in many cases, in particular in image classification, it is desirable to have additional types of transformations. Indeed, bijective transformations are deterministic and allow exact likelihood computation, but are required to preserve dimensionality. On the other hand, stochastic transformations are capable of altering the dimensionality of the random variables but only provide a stochastic lower bound estimate of the likelihood. Interestingly, the inventors devised techniques to train and use models that include transformations that can alter dimensions, while also allowing exact likelihood evaluation.

To facilitate arbitrary combinations of different types of transformations, the inventors envisaged to represent transformations in terms of three components: (i) a forward transformation, $f: \mathcal{Z} \to \mathcal{X}$ with an associated conditional probability $p(x|z)$, (ii) an inverse transformation, $f^{-1}: \mathcal{X} \to \mathcal{Z}$ with an associated distribution $q(z|x)$, and (iii) a likelihood contribution term approximating a difference between the marginal probability distributions of the transformation inputs and outputs, used for log-likelihood computations. Specifically, the inventors envisaged to represent a density $p(x)$ under any transformation by restating it as:

$$\log p(x) \simeq \log p(z) + \mathcal{V}(x,z) + \varepsilon(x,z), \quad z \sim q(z|x)$$

where $\mathcal{V}(x,z)$ and $\varepsilon(x,z)$ are referred to as the likelihood contribution and bound looseness terms, respectively. The term $p(z)$ shows that this representation may be used in models in which multiple such transformations are composed, since the term $p(z)$ may itself be determined as an output of other transformation(s). The term $\varepsilon(x,z)$ represents a lower bound of approximating $\log p(x) - \log p(z)$ by $\mathcal{V}(x,z)$.

FIG. 4a and FIG. 4b show detailed, yet non-limiting, examples of transformations that may be used in the models described herein.

FIG. 4a shows a bijective transformation BT, 441. It can be seen from the figure that respective transformation inputs 431-433 are mapped by the bijective transformation to respective transformation outputs 451-453. An inverse transformation is uniquely defined that maps transformation outputs 451-453 to respective transformation inputs 431-433. Mapping an input to an output and mapping the output back to the input, results in the original input. Similarly, mapping an output to the input and back to the output, results in the original output.

FIG. 4b shows a stochastic transformation ST, 442, e.g., $p(x|z)$. At least some transformation inputs 431-433 do not map deterministically to a unique transformation output 451-453 (e.g., transformation input 431 shown in the figure maps with nonzero probability to transformation output 451 and with nonzero probability to transformation output 452, etc.). An inverse transformation is shown, typically, a variational distribution $q(z|x)$ approximating the posterior $p(z|x)$. Also for the inverse, at least some transformation outputs 451-453 do not map deterministically to a unique transformation input 431-433 (e.g., transformation output 451 shown in the figure maps with nonzero probability to transformation input 431 and with nonzero probability to transformation input 432). Accordingly, applying the transformation to a transformation input and applying the inverse does not necessarily result in the original input, and applying the inverse to a transformation output and applying the transformation does not necessarily result in the original output.

Bijective transformation BT and stochastic transformation ST may be described in terms of a forward transformation, an inverse transformation, and a likelihood contribution as follows.

Forward Transformation: For stochastic transformation ST, the forward transformation may be defined by a conditional distribution $p(x|z)$. For bijective transformation BT, the forward transformation may be a deterministic function, e.g., $p(x|z) = \delta(x - f(z))$ or $x = f(z)$.

Inverse Transformation: For bijective transformation BT, the inverse is also a deterministic function, e.g., $z = f^{-1}(x)$. For stochastic transformation ST, the inverse is also stochastic. The inverse may be defined according to Bayes theorem, e.g., as $p(z|x) = p(x|z)p(z)/p(x)$. In many cases, $p(z|x)$ is intractable or too expensive to compute, and thus a variational approximation $q(z|x)$ may be used.

Likelihood Contribution: For bijection BT, density p(x) may be computed from p(z) and the mapping $f$ using the change-of-variables formula as:

$$\log p(x) = \log p(z) + \log |\det \nabla_x f^{-1}(x)|, \ z = f^{-1}(x)$$

where $|\det \nabla_x f^{-1}(x)|$ is the absolute value of the determinant of the Jacobian matrix $J := \nabla_x f^{-1}(x)$ of $f$. Accordingly, the likelihood contribution term for a bijective transformation $f$ may be defined as $\log|\det \nabla_x z|$, with lower bound $\varepsilon(x,z) = 0$.

For stochastic transformation ST, marginal density p(x) may be re-written as:

$$\log p(x) = \underbrace{\mathbb{E}_{q(z|x)}[\log p(x|z)] - \mathbb{D}_{KL}[q(z|x)\|p(z)]}_{ELBO} + \underbrace{\mathbb{D}_{KL}[q(z|x)\|p(z|x)]}_{Gap\ in\ Lower\ Bound}$$

The ELBO $\mathcal{L}$ in this equation may evaluated using a single Monte Carlo as:

$$\mathcal{L} \approx \log p(z) + \log \frac{p(x|z)}{q(z|x)}, \ z \sim q(z|x)$$

Accordingly, the likelihood contribution term for a stochastic transformation ST may be defined as a difference in log-likelihoods of the transformation outputs given the transformation inputs, and the transformation inputs given the transformation outputs, e.g., $$\log \frac{p(x|z)}{q(z|x)}.$$

The bound looseness term may be $$\varepsilon(x, z) = \log \frac{q(z|x)}{p(z|x)}.$$

It may be noted that the change-of-variables formula for bijection BT can be recovered from the formula for a stochastic transformation ST by using Dirac delta functions.

As an example, for a model obtained by composing respective bijective and stochastic transformations $\{f_t\}_{t=1}^T$, the log-likelihood of a model output x given a prior distribution p(z) on input instances may be approximated according to the following code:

---
Algorithm. Compute log-likelihood(x)
---

Data: x, p(z) & $\{f_t\}_{t=1}^T$
Result: $\mathcal{L}(x)$
for t in range(T), do
  if $f_t$ is bijective then
    $z = f_t^{-1}(x)$ $$v_t = \log\left|\det \frac{\partial z}{\partial x}\right|$$

else if $f_t$ is stochastic then
    $z \sim q_t(z|x)$

---
Algorithm. Compute log-likelihood(x)
---

$$v_t = \log \frac{p_t(x|z)}{q_t(z|x)}$$

$x = z$ return $\log p(z) + \sum_{t=1}^T v_t$

As the skilled person understands, this code may be adapted to cover generative surjections and inference surjections, as discussed herein, as well.

FIG. 4c show a detailed, yet non-limiting, example of a transformation that may be used in the models described herein. The transformation shown in this figure is a generative surjective transformation GST, 443. Let $\mathcal{X} \subseteq \mathbb{R}^{d_x}$ and $\mathcal{Z} \subseteq \mathbb{R}^{d_z}$ be two random variables. Generative surjection GST may be represented as a deterministic function $f: \mathcal{Z} \to \mathcal{X}$ in the generative direction (e.g. going from classes to images). For example, the function may map transformation inputs 431-433 to transformation outputs 451-452 as shown in the figure. The function $f$ is surjective, e.g., at least for some set $\mathcal{X}$, $\forall x \in \mathcal{X}$, $\exists z \in \mathcal{Z}$ such that $x = f(z)$. However, function $f$ is not a bijection since it is not injective, e.g., if $x = f(z_1)$ and $x = f(z_2)$, then $z_1$ may not necessarily be equal to $z_2$. That is, multiple inputs can map to a single output. For example, both transformation input 432 and transformation input 433 may map to transformation output 452. Accordingly, when inverting the generative surjection GST, a loss of information may occur since the input is not guaranteed to be recovered through inversion.

Interestingly, the inventors realized that also generative surjection GST may be represented as a forward transformation, an inverse transformation, and a likelihood contribution:

Forward Transformation: Similarly to the bijection of FIG. 4a, surjective transformation GST may be represented by a deterministic forward transformation $p(x|z) = \delta(x - f(z))$ or $x = f(z)$.

Inverse Transformation: In contrast with the bijection of FIG. 4a, however, surjection $f: \mathcal{Z} \to \mathcal{X}$ is not invertible since multiple inputs can map to the same output. However, a right inverse may be defined for the surjection in the inference direction (e.g., going from images to classes), e.g., a function $g: \mathcal{X} \to \mathcal{Z}$ such that $f \cdot g(x) = x$, but not necessarily $g \cdot f(z) = z$. The inverse transformation may be defined according to Bayes' formula. For efficiency reasons however, it is usually preferred to approximate the inverse transformation by a stochastic transformation $q(z|x)$. This stochastic transformation may effectively pass transformation output x through a random right inverse g. Preferably, the stochastic transformation $q(z|x)$ for a transformation output x has support only over the set of transformation inputs z that map to that transformation output, e.g., $\mathcal{B}(x) = \{z | x = f(z)\}$.

Likelihood Contribution: The likelihood contribution may be defined as:

$$\mathbb{E}_{q(z|x)}\left[\log \frac{p(x|z)}{q(z|x)}\right], \text{ as } p(x|z) \to \delta(x - f(z))$$

In the deterministic limit, this term may simplify to $-\log q(z|x)$. Generally, generative surjections GST may give rise to a stochastic approximation of the likelihood contribution when a non-zero lower likelihood estimate.

FIG. 4d shows a detailed, yet non-limiting example of a transformation that may be used in the models described herein. Shown in this figure is an inference surjective transformation IST, 444.

Forward Transformation: In contrast to the transformation of FIG. 4c, which is surjective in the generative direction $\mathcal{Z} \to \mathcal{X}$ (e.g., going from classes to images), this transformation is surjective in the inference direction $\mathcal{X} \to \mathcal{Z}$ (e.g., going from images to classes). Accordingly, in the generative direction, the forward transformation p(x|z) may be stochastic, e.g., at least one transformation input 431-432 does not map uniquely to a transformation output 451-453. For example, as shown in the figure, transformation input 432 may map with non-zero probability to transformation output 452 and with non-zero probability to transformation output 453. The forward transformation may also be derived from the inverse transformation according to Bayes'.

Inverse Transformation: The inverse transformation may be deterministic, e.g., each transformation output maps to a unique transformation input; but not injective, e.g., there are two transformation outputs 452, 453 mapping to the same transformation input 432. Preferably, the stochastic forward transformation for a given transformation input has support only over the set of transformation outputs that map to that transformation input.

Likelihood Contribution: The likelihood contribution may be defined as:

$$\mathbb{E}_{q(Z|X)}\left[\log \frac{p(X|Z)}{q(Z|X)}\right], \text{ as } q(z|x) \to \delta(z - f^{-1}(x))$$

In the deterministic limit, this term may simplify to log p(x|z). While the generative surjections of FIG. 4c generally give rise to stochastic estimates of the likelihood contribution and introduce a lower likelihood estimate, interestingly, the inventors were able to show that inference surjections allow exact likelihood computation, e.g., with a bound looseness term of zero.

The following table summarizes transformations, inverse transformations, likelihood contributions, and bound looseness terms discussed w.r.t. FIG. 4a-4d:

| Transformation | Forward | Inverse | V(x, z) | ε(x, z) |
|---|---|---|---|---|
| Bijective | x = f(z) | z = f⁻¹(x) | $\log\|\det \nabla_x z\|$ | 0 |
| Stochastic | x~p(x\|z) | z~q(z\|x) | $\log \frac{p(x\|z)}{q(z\|x)}$ | $\log \frac{q(z\|x)}{p(z\|x)}$ |
| Surjective (Gen.) | x = f(z) | z~q(z\|x) | $\log \frac{p(x\|z)}{q(z\|x)}$ as $p(x\|z) \to \delta(x - f(z))$ | $\log \frac{q(z\|x)}{p(z\|x)}$ |
| Surjective (Inf.) | x~p(x\|z) | z = f⁻¹(x) | $\log \frac{p(x\|z)}{q(z\|x)}$ as $q(z\|x) \to \delta(z - f^{-1}(x))$ | 0 |

FIG. 4e shows a detailed, yet non-limiting, example of a trained model, specifically, an image classifier. The figure shows image classifier IC, 420, being applied to classify an input image II, 410, into a class CL, 460, from a set of classes. The input image II can for example be represented as a 2D volume or as a 3D volume comprising one or more channels (e.g., 1 for greyscale or 3 for colour). The set of classes may be a finite, predefined set, e.g., of two or more classes, at most or at least 5 classes, at most or at least 10 classes. The classes need not be mutually exclusive, e.g., the classes may be regarded as attributes (e.g., in a traffic situation: "motorbike rider", "riding straight", "overtaking"), the image classifier being configured to classify the class as having one or more of the set of attributes.

Interestingly, the inventors realized that an image classifier IC may be implemented using combination of one or more transformations as described with respect to FIG. 4a-4d. Specifically, if the transformations of FIG. 4a-4d are regarded as transformations $\mathcal{Z} \to \mathcal{X}$ in a generative direction, then the image classifier IC may be regarded as being a transformation p(y|x) composed of inverse transformations, in an inference direction $\mathcal{X} \to \mathcal{Z}$, as described with respect to FIG. 4a-4d. An inverse model for image classifier may then be defined by inverting the respective transformations making up the image classifier IC, e.g., by using the forward transformations described with respect to FIG. 4a-4d. Accordingly, the inverse model for image classifier IC may define a class-conditional generative model p(x|y) going from class CL to input image II.

Advantageously, the provided techniques allow the image classifier IC to be a deterministic function y=f(x) with a stochastic inverse model p(x|y). This is not possible when using just bijective transformations, e.g., since the function f representing an image classifier is not a bijection (multiple input images II may be mapped to the same class). It is also not possible when using just stochastic transformations, since this would result in a stochastic map from images to classes.

Instead, it can be enabled by including at least one inference stochastic transformation IST, 444, in the image classifier IC, e.g., as described with respect to FIG. 4d. This is a transformation that, in the inference direction, is deterministic and non-injective.

Image classifier IC may be applied to an input image II to classify the input image into a class CL, by applying the respective transformations of the image classifier in the inference direction. Accordingly, transformation inputs TI, 430, of transformation IST may be determined from the input image II, and the transformation may then be applied to the transformation inputs TI as a deterministic function z=g(x) to obtain transformation outputs TO, 450. Output classification CL may then be determined based on the transformation outputs TO. The function g may be parameterized by a set of parameters of the image classifier IC.

Image classifier IC may also be used to generate synthetic input images II by applying the respective inverses of the transformations of the image classifier in the generative direction. For example, the image classifier may generate an input image given a class CL (or multiple non-mutually-exclusive attributes), or more generally, given values at an internal or output layer of the model. As also described with respect to FIG. 4d, an inverse of inference surjection IST can be approximated in the inverse model by a stochastic inverse transformation (there called the forward transformation). The stochastic inverse transformation may define a probability distribution p(x|z) for transformation inputs TI given transformation outputs TO. In other words, the stochastic inverse transformation may be configured to stochastically generate transformation inputs TI given transformation outputs TO. The definition of the probability distribution p(x|z) may be parameterized by a set of parameters of the image classifier CL, possibly overlapping with the parameters of the function g. Thus, when generating an image II, transformation inputs TI may be sampled given transformation outputs TO according to the probability distribution.

(Note that FIG. 4d described the transformation in the generative direction; accordingly, transformation inputs TI of FIG. 4e correspond to transformation outputs 451-453 of FIG. 4d, and transformation outputs TO of FIG. 4e correspond to transformation inputs 431-432 of FIG. 4d.)

Image classifier IC may be trained using maximum likelihood estimation. That is, an optimization may be performed in which the parameters of the image classifier IC, including parameters of the (forward and/or inference transformations of the) inference surjection IST, may be optimized with respect to an objective function. The objective function may include log-likelihoods for images from a training dataset, and may be maximized. The objective function can include additional terms, e.g., regularizers, etc.

Interestingly, image classifier IC may be trained based on a training dataset containing any combination of labelled training images, i.e., for which an associated training class is available; and unlabelled training images, for which no associated training class may be available. For a labelled training image, the log-likelihood to be maximized may be a log-likelihood log p(x,y) for the labelled training image and its label according to a joint probability distribution of input images and classes determined by the image classifier IC. For an unlabelled training image, the log-likelihood to be maximized may be a log-likelihood log p(x) for the unlabelled training image according to a probability distribution of input images being generated by the inverse model.

Interestingly, in both cases, the log-likelihood may be efficiently computed based on the likelihood contributions of the various transformations as described with respect to FIG. 4a-4d. The likelihood contributions may estimate the difference in log-likelihood between transformation outputs and transformation outputs, so summing up the likelihood contributions of respective transformations may estimate a difference in log-likelihood between inputs and outputs of the combined transformation. This difference can then be used to compute the log-likelihoods for training images.

Typically, training is performed using stochastic optimization, e.g., stochastic gradient descent. For example, the Adam optimizer may be used as described in Kingma and Ba, "Adam: A Method for Stochastic Optimization" (incorporated herein by reference and available at https://arxiv.org/abs/1412.6980). As is conventional, such optimization methods may be heuristic and/or arrive at a local optimum. Training may be performed on an instance-by-instance basis or in batches, e.g., of at most or at least 64 or at most or at least 256 instances.

It is noted that the image classifier does not need to consist of only transformations as described with respect to FIG. 4a-4d. Specifically, the output of the classifier may be determined using an output layer, e.g., as discussed with respect to FIG. 5a. An output layer is not considered to belong to the set of transformations. Apart from optionally using an output layer, in some embodiments the image classifier IC can consist entirely of transformations of the four described types. Apart from optionally using an output layer, in some embodiments the image classifier IC can consist entirely of bijective and inference surjective transformations. It is however also possible to use generative surjective and/or stochastic transformations in image classifiers.

Moreover, as the skilled person understands, by suitably adapting the image classifier IC, it can also be used for non-image input instances (e.g., other types of sensor data) and/or for non-classification tasks (e.g., regression, data generation, etc.).

Various advantageous model components are described below that can be used in image classifier IC or other trained models. Various example model architectures for image classifier IC, based on these components, are also discussed below.

FIG. 5a shows a detailed, yet non-limiting, example of an output layer for use, e.g., in image classifier IC or another classifier. The image classifier may be configured to determine a vector $\pi 1, \ldots, \pi k$, 531, of class probabilities of an input image for respective classes. This is typically done using a set of transformations of the types of FIG. 4a-4d, as also discussed with respect to FIG. 4e. The output layer of the image classifier may then determine the class y, 551, of the input image from the class probabilities $\pi i$.

The output layer discussed in this figure is not considered to be part of the set of transformations. It is similar to stochastic transformations in the sense that $p(y|\pi)$ and $p(\pi|y)$ are defined stochastically, but interestingly, can be evaluated analytically, thereby avoiding variational inference.

As shown in the figure, the output layer may be defined by a conditional probability distribution $p(\pi|y)$ for the vector of class probabilities given the determined class. This conditional probability distribution can for example be defined by respective probability distributions for respective classes, such as normal distributions $p(\pi|y)=N(\pi|\mu_y,\sigma_y)$ as shown in the figure.

During training, log-likelihoods for training images may be computed based on this conditional probability distribution. Assuming a given prior distribution over the class labels, e.g., $p(y)=1/K$ can be used where K is the number of classes, it is possible to compute a marginal probability of the vector of class probabilities, e.g.:

$$p(\pi) = \sum_y p(\pi | y) p(y)$$

and thereby also a conditional probability of a class given the vector of class probabilities $p(y|\pi)$, e.g., using Bayes rule.

For unlabelled training images, a log-likelihood for the training image may be determined by combining the marginal probability of the class vector with the likelihood contributions of the set of transformations, e.g.:

$$\log p(x) = \log p(\pi) + \sum_l V_l.$$

For labelled training images, the log-likelihood may be determined by combining the prior distribution over the labels, the conditional probability of class vectors given a class, and the likelihood contributions, e.g.:

$$\log p(x, y) = \log p(y) + \log p(\pi | y) + \sum_l V_l.$$

Here, the values $V_l$ are the likelihood contributions of the transformations making up the image classifier, as also discussed with respect to FIG. 4a-4e.

Concretely, during training, an image may be selected, and the image classifier may be applied to obtain class probabilities $\pi$. For unlabelled training images, based on the class probabilities, log $p(\pi)$ may be determined. Likelihood contributions for respective transformations can be determined based on their respective transformation inputs and outputs, and the likelihood contributions can be summed as described above to obtain log $p(x)$. For labelled training images, similarly, log $p(y)$ and log $p(\pi|y)$ as described above can be combined with the likelihood contributions to obtain log $p(x,y)$. The log-likelihoods for labelled and/or unlabelled training examples can be maximized, e.g., by evaluating the gradient of the log-likelihoods with respect to the parameters of the image classifier and using gradient descent.

The trained image classifier can be used to classify input images into classes, e.g., by determining class probabilities $\pi$ for the input image, and using Bayes' rule to determine a probability of the image belonging to a class, e.g.:

log $p(y|x)$=log $p(y,x)$–log $p(x)$=log $p(y)$+log $p(\pi|y)$–$p(\pi)$=log $p(y|\pi)$ The final output label y may be chosen deterministically, e.g., as the class with highest probability, or probabilistically, e.g., by sampling y according to class probabilities. It is also possible to output the determined probabilities $p(y|x)$ for some or all classes, for example. In particular, the most likely class may be returned with $p(y|x)$ given as a confidence score.

The trained image classifier can also be used as a class-conditional generative model $p(x|y)$ by sampling an image according to the probability distribution for the class vector given a class and for the inverse transformations given the vector, e.g.:

log $p(x|y)$=log $p(x|\pi)$–log $p(\pi|y)$–log $p(\pi)$ where $p(x|\pi)$ is the stochastic inverse of the combination of the set of transformations. The trained image classifier can also be used as a generative model based on log $p(x|\pi)$, e.g., by starting from a set of class probabilities and generating the input image from there. This way a given combination of output classes may be achieved.

FIG. 5b shows a detailed, yet non-limiting example of an inference surjective slicing transformation for use in an image classifier or other type of trained model.

The slicing transformation may determine transformation output z, 552 from transformation input x1,x2 532 by taking a (strict, non-empty) subset of the elements of the transformation input, e.g., given transformation input $x=(x_1,x_2) \in R^{d_z}$ it may determine the transformation output as $z=f(x)=x_1$.

As shown in the figure, the stochastic inverse transformation for the slicing transformation may set the selected elements from the transformation input as in the transformation output, e.g., $x_1=z$. The non-selected elements may be approximated by sampling them from the transformation output, e.g., $x_2 \sim p(x_2|z)$.

By filling in the general formula for the likelihood contribution for inference surjective transformations, the likelihood contribution for this transformation may be determined as log $p(x_2|z)$, e.g., as the entropy of the probability distribution used to infer the sliced elements $x_2$.

As also described elsewhere, a generative surjective slicing transformation may be defined analogously.

FIG. 5c shows a detailed, yet non-limiting example of an inference surjective maximum value transformation for use in an image classifier or other type of trained model.

The maximum value transformation may determine transformation output z, 553, as a maximum of multiple transformation inputs x1, . . . , xk, . . . , xK, 533.

As shown in the figure, the stochastic inverse transformation may proceed by (i) sampling an index k of a maximal transformation input, e.g., such that $x_k=z$, (ii) deterministically mapping z to $x_k=z$, and (ii) sampling the remaining non-maximal transformation inputs values $x_{-k}$ of x such that they are all smaller than $x_k$, $x_{-k} \sim p(x_{-k}|z,k)$. Here, k refers to the indices of x, K is the number of elements in x and $x_{-k}$ is x excluding element k.

Probability distribution $p(k|z)$ can for example be trained a classifier, or fixed, e.g. $p(k|z)=1/K$. For the inverse transformation to be a right inverse of the forward transformation, $p(x_{-k}|z,k)$ is preferably defined such that it only has support in $(-\infty,z)^{K-1}$. This way, $x_k$ is indeed the maximum value.

For example, log $p(k|z)$ may be defined such that the output is equally likely to be copied to any of its inputs. The remaining inputs can be sampled such that the copied value remains the largest, e.g., they may be set equal to this maximum value minus noise from a standard half-normal distribution, e.g., Gaussian distribution with only positive values.

The likelihood contribution for this transformation may be determined from the general formula as:

$$\mathcal{V} = \log p(k|z) + \log[(x_{-k}|z,k), \text{ where } z=x_k=\max x,$$
$$k=\arg\max x.$$

For example, an image classifier may comprise a max pooling layer for use in downsampling, implemented as a set of maximum value surjections operating on respective subsets of an input volume. The maximum value transformation can be adapted to compute minimum values as well.

As also described elsewhere, a generative surjective maximum value transformation may be defined analogously.

Another advantageous transformation for use herein is a rounding surjection that takes a transformation input and rounds it, e.g., computes its floor. The forward transformation may be a discrete, deterministic, non-injective function, e.g., $P(x|z)=\mathcal{B}(z \in \mathbb{I}(x))$, for $\mathcal{B}(x)=\{x+u|u \in [0,1)^d\}$. A stochastic inverse transformation $q(z|x)$ may be determined with support the set of values that are rounded to a certain number, e.g., in $\mathcal{B}(x)$. This transformation may be used as a generative surjective transformation, in which case the likelihood contribution may be determined e.g. as $\mathcal{V}(x,z)=\mathbb{E}_{q(z|x)}[-\log q(z|x)]$, or as an injective surjective transformation, in which the likelihood contribution may be determined e.g. as $\mathcal{V}(x,z)=\mathbb{E}_{p(x|z)}[\log p(x|z)]$. Rounding transformations may be used to more accurate model discrete data, e.g., discrete image data.

Another advantageous transformation for use herein is an absolute value surjection that returns the magnitude of its input, $z=|x|$. As inference surjection, its forward and inverse transformations may be represented as follows:

$$p(x|z) = \sum_{s \in \{-1,1\}} \delta(x-sz)P(s|z), \quad q(z|x) = \sum_{s \in \{-1,1\}} \delta(z-sx)\delta_{s,sign(x)}.$$

Here, $q(z|x)$ is deterministic corresponding to $z=|x|$. The inverse transformation $p(x|z)$ may involve the following steps: (i) sample the sign s of the transformation input, conditioned on the transformation output z, and (ii) apply the sign to the transformation output z to obtain transformation input $x=sz$. Absolute value surjections are beneficial for modelling data with symmetries.

The probability distribution p(s|z) for sampling the sign can be trained as a classifier or fixed, e.g. to p(s|z)=½. Fixing the sign may be particularly useful to enforce exact symmetry across the origin.

The likelihood contribution for the inference surjection may be determined as $\mathcal{V}$=log p(s|z), where z=sx=|x|, s=sign(x).

As a generative surjection, the forward and inverse may be defined as:

$$p(x|z) = \sum_{s \in \{-1,1\}} p(x|z, s)p(s|z) = \sum_{s \in \{-1,1\}} \delta(x - sz)\delta_{s,sign(z)},$$

$$q(z|x) = \sum_{s \in \{-1,1\}} q(z|x, s)q(s|x) = \sum_{s \in \{-1,1\}} \delta(z - sx)q(s|x),$$

where the forward transformation p(x|z) is fully deterministic and corresponds to x=|z|. The inference direction involves two steps, 1) sample the sign s of the transformation input z conditioned on the transformation output x, and 2) deterministically map the transformation output x to z=sx. Here, the probability distribution for the sign q(s|x) can be trained as a classifier, or fixed to e.g. q(s|x)=½. The last choice is beneficial especially when p(z) is symmetric.

The likelihood contribution in this case may be determined as $\mathcal{V} \approx$ –log q(s|x), where z=sx, s~q(s|x).

Absolute value surjections can be beneficially used to model anti-symmetric, for example, with a trainable classifier P(s|z)) for learning the unfolding.

Another advantageous transformation for use herein is a sort surjection. The sort surjection can be used as a generative surjection x=sortz or as an inference surjection z=sortx.

As a generative surjection, the sort surjection may be represented as:

$$p(x|z) = \sum_\mathcal{J} p(x|z, \mathcal{J})p(\mathcal{J}|z) = \sum_\mathcal{J} \delta(x - \mathbf{z}_\mathcal{J})\delta_{\mathcal{J},argsort(z)},$$

$$q(z|x) = \sum_\mathcal{J} q(z|x, \mathcal{J})q(\mathcal{J}|x) = \sum_\mathcal{J} \delta(z - \mathbf{x}_{\mathcal{J}_{-1}})q(\mathcal{J}|x),$$

where $\mathcal{J}$ refers to a set of permutation indices, $\mathcal{J}^{-1}$ refers to the inverse permutation indices and $z_\mathcal{J}$ refers to the elements of z permuted according to the indices $\mathcal{J}$. Note that there are D! possible permutations.

The forward transformation p(x|z) is fully deterministic and corresponds to sorting the inputs, x=sortz. The inference direction may be implemented by: 1) sampling permutation indices $\mathcal{J}$ conditioned on the sorted transformation output x, and 2) deterministically permuting the transformation output x according to the inverse permutation $\mathcal{J}^{-1}$ to obtain the transformation input $z=x_{\mathcal{J}_{-1}}$. Here, the probability distribution q($\mathcal{J}$|x) defining the permutation indices can be trained as a classifier or fixed to e.g. q($\mathcal{J}$|x)=1/D!.

The likelihood contribution for this transformation may be computed as: $\mathcal{V} \approx$ –log q($\mathcal{J}$|x), where $\mathcal{J}$ ~q($\mathcal{J}$|x).

As an inference surjection, the sort surjection may be represented as:

$$p(x|z) = \sum_\mathcal{J} p(x|z, \mathcal{J})p(\mathcal{J}|z) = \sum_\mathcal{J} \delta(x - \mathbf{x}_{\mathcal{J}_{-1}})p(\mathcal{J}|z),$$

$$q(z|x) = \sum_\mathcal{J} q(z|x, \mathcal{J})q(\mathcal{J}|x) = \sum_\mathcal{J} \delta(z - \mathbf{x}_\mathcal{J})\delta_{\mathcal{J},argsort(x)},$$

where $\mathcal{J}$ refers to a set of permutation indices, $\mathcal{J}^{-1}$ refers to the inverse permutation indices and $x_\mathcal{J}$ refers to the elements of x permuted according to the indices $\mathcal{J}$. Note that there are D! possible permutations.

The transformation q(z|x) is fully deterministic and corresponds to sorting the inputs, z=sortx. The inverse transformation may involve 1) sampling permutation indices $\mathcal{J}$ conditioned of transformation outputs z, and 2) deterministically permute the transformation outputs z according to the inverse permutation $\mathcal{J}^{-1}$ to obtain the transformation inputs $x=z_{\mathcal{J}_{-1}}$. Here, the probability distribution defining the permutation indices p($\mathcal{J}$|z) can be trained as a classifier or fixed to e.g. p($\mathcal{J}$|z)=1/D!.

The likelihood contribution for this transformation may be computed as: $\mathcal{V}$=log p($\mathcal{J}$|z), where z=$x_\mathcal{J}$ =sortx, $\mathcal{J}$ =arg sortx.

Sort surjections are particularly beneficial modelling naturally sorted data, learning order statistics, and learning an exchangeable model using flows. In particular, exchangeable data may be modelled by composing any number of transformations together with a sorting surjection.

Another advantageous transformation is a stochastic permutation. This is a stochastic transform that randomly permutes its input. An inverse pass may be defined that mirrors the forward pass.

The forward and inverse transformations may be defined as:

$$p(x|z) = \sum_\mathcal{J} p(x|z, \mathcal{J})p(\mathcal{J}) = \sum_\mathcal{J} \delta(x - \mathbf{z}_\mathcal{J})Unif(\mathcal{J}), \qquad (43)$$

$$q(z|x) = \sum_\mathcal{J} q(z|x, \mathcal{J})q(\mathcal{J}) = \sum_\mathcal{J} \delta(z - \mathbf{x}_{\mathcal{J}_{-1}})Unif(\mathcal{J}), \qquad (44)$$

where $\mathcal{J}$ refers to a set of permutation indices, $\mathcal{J}^{-1}$ refers to the inverse permutation indices and $z_\mathcal{J}$ refers to the elements of z permuted according to the indices $\mathcal{J}$. Note that there are D! possible permutations.

The transformation is stochastic and may involve the same steps in both directions: 1) sampling permutation indices $\mathcal{J}$, e.g., uniformly at random, and 2) deterministically permuting the input according to the sampled indices $\mathcal{J}$.

When using uniformly random sampling, it can be shown that the likelihood contribution is zero. Stochastic permutations are useful for modelling exchangeable data by composing any number of transformations with a stochastic permutation layer, thus enforcing permutation invariance.

For example, exchangeable data may be modelled by using one or more coupling flows parameterized by Transformer networks (A. Vaswani et al., "Attention Is All You Need", available at https://arxiv.org/abs/1706.03762 and incorporated herein by reference), not using positional encoding. For example, stochastic permutations may be inserted in between respective coupling layers, or an initial sorting surjection may be used to induce an ordering, with fixed permutations being used after.

The following table summarizes several advantageous inference surjection layers described herein.

| Name | Forward transform | Inverse transform | Likelihood contr. |
|---|---|---|---|
| Rounding | $x \sim p(x\|z)$ where $x \in [z, z+1]$ | $z = \lfloor x \rfloor$ | $\log p(z\|x)$ |
| Slicing | $x_1 = z$, $x_2 \sim p(x_2\|z)$ | $z = x_1$ | $\log p(x_2\|z)$ |
| Abs value | $s \sim \text{Bern}(\pi(z))$ | $s = \text{sign} x$ | $\log p(s\|z)$ |
|  | $x = s \cdot z$, $s \in \{-1, 1\}$ | $z = \|x\|$ |  |
| Max value | $k \sim \text{Cat}(\pi(z))$ | $k = \arg\max x$ | $\log p(k\|z) +$ |
|  | $x_k = z$, $x_{-k} \sim p(x_{-k}\|z, k)$ | $z = \max x$ | $\log p(x_{-k}\|z, k)$ |
| Sort | $\mathcal{J} \sim \text{Cat}(\pi(z))$ | $\mathcal{J} = \arg\text{sort} x$ | $\log p(\mathcal{J}\|z)$ |
|  | $x = z_{\mathcal{J}}$ | $z = \text{sort} x$ |  |
| ReLU | if $z = 0$: $x \sim p(x)$, else: $x = z$ | $z = \max(x, 0)$ | $\mathbb{I}(z = 0)\log p(x)$ |

The following table summarizes several advantageous generative surjection layers described herein.

| Surjection | Forward | Inverse | Likelihood contr. |
|---|---|---|---|
| Rounding | $x = \lfloor z \rfloor$ | $z \sim q(z\|x)$ where $z \in [x, x+1]$ | $-\log q(z\|x)$ |
| Slicing | $x = z_1$ | $z_1 = x$, $z_2 \sim q(z_2\|x)$ | $-\log q(z_2\|x)$ |
| Abs value | $s = \text{sign} z$ | $s \sim \text{Bern}(\pi(x))$ | $-\log q(s\|x)$ |
|  | $x = \|z\|$ | $z = s \cdot x$, $s \in \{1, -1\}$ |  |
| Max value | $k = \arg\max z$ | $k \sim \text{Cat}(\pi(x))$ | $-\log q(k\|x)$ |
|  | $x = \max z$ | $z_k = x$, $z_{-k} \sim q(z_{-k}\|x, k)$ | $-\log q(z_{-k}\|x, k)$ |
| Sort | $\mathcal{J} = \arg\text{sort} z$ | $\mathcal{J} \sim \text{Cat}(\pi(x))$ | $-\log q(\mathcal{J}\|x)$ |
|  | $x = \text{sort} z$ | $z = x_{\mathcal{J}}$ |  |
| ReLU | $x = \max(z, 0)$ | if $x = 0$: $z \sim q(z)$, else: $z = x$ | $\mathbb{I}(x = 0)[-\log q(z)]$ |

Various advantageous combinations of the above transformations can be defined. The image classifier may be a neural network, e.g., at least in the inference direction, class probabilities may be determined for an input image by a function representable by a neural network. For example, this may be the case when using bijections and inference surjections whose trainable parts are given by neural networks.

Generally, the image classifier may comprise one or more convolutional layers in which an input volume (e.g., of size m×n×c) is transformed by the layer to an output volume (e.g., of size m'×n'×c'), and in which a spatial correspondence between input and output volume is preserved. Such a layer may be implemented by one or more transformations as described herein. An image classifier comprising such layers may be referred to as being a convolutional model. For example, the image classifier may be a convolutional neural network. The image classifier may for example comprise at most or at least 5, at most or at least 10, or at most or at least 50 convolutional layers.

For example, the image classifier may comprise a convolutional coupling transformation, as also described elsewhere. In an embodiment, the image classifier comprises a ReLU layer applying the ReLU transformation to respective parts of its input vector. In an embodiment, the image classifier comprises a max pooling layer applying the max transformation convolutionally to its input volume, thus downscaling the spatial dimensions of the input volume. In an embodiment, the image classifier comprises a slicing transformation selecting a subset of channels, this reducing the number of channels.

The convolutional layers may be followed by one or more non-convolutional layers, for example, one or more densely connected layers. Such a densely connected layer may be implemented, for example, by combining a linear bijective transformation and a slicing transformation. For example, the number of non-convolutional layers may be one, two, at most or at least 5, or at most or at least 10.

FIG. 5d shows a detailed, yet non-limiting example of an image classifier, for example, based on the image classifier of FIG. 4e.

Specifically, shown in the figure is an input image x, 510, being transformed by a sequence of transformations into a set of class probabilities π, 560, for respective classes. Based on the set of class probabilities, a class may be determined, e.g., as discussed with respect to FIG. 5a. The image classifier in this example uses only bijective and inference surjective transformations, and accordingly, $\pi = g(x)$ is given by a deterministic function.

Specifically, shown in the example is a convolutional coupling transformation CC, 541, being applied to input image x. This is a bijective transformation. As also described elsewhere, such a layer may compute first and second transformation output based on first and second transformation inputs by applying two transformations, e.g., as described in A. Gomez et al., "The Reversible Residual Network: Backpropagation Without Storing Activations" (available at https://arxiv.org/abs/1707.04585 and incorporated herein by reference). Both applied transformations are convolutions applied to their respective input volumes.

After the convolutional coupling transformation, in this example, a ReLU layer 542 is applied, as also described elsewhere. This is an inference surjective layer. Next, a max pooling layer MP, 543 is applied. This layer performs downscaling by convolutionally applying the max transformation across its input.

Layers 541-543 are convolutional layers determining respective output volumes from respective input volumes. Layers 541-543 may be repeated multiple times, individually or in combination.

A flatten layer F, 544 is further applied, that converts the output of the last convolutional layer into a one-dimensional feature vector. A tensor slicing layer TS, 545, is then applied to select a subset of the features.

In this particular example, log-likelihoods for training may be computed by computing a sum of likelihood contributions for the respective transformations, e.g.:

$V_1 = \log|\det J|$ for the convolutional coupling transformation CC;

$V_2 = \mathbb{I}(z=0) \log p(x)$ for the ReLU layer;

$V_3 = \log p(k|z) + \log p(x_{-k}|z,k)$ for the max pooling layer MP;

$V_4=0$ for the flatten layer F;

$V_5=\log p(x_2|z)$, where $x=(x_1,x_2)$ and $z=x_1$ for the tensor slicing layer TS.

Many variations will be envisaged by the skilled person. In particular, the ReLU layer may be replaced by the "Sneaky ReLU" activation function by M. Finzi et al., "Invertible Convolutional Networks", proceedings First workshop on Invertible Neural Networks and Normalizing Flows at ICML 2019. Interestingly, this activation function is invertible and has closed-form inverse and log determinants. Optionally, the model may also include an initial generative rounding surjection to accommodate for the discrete nature of input image data and avoid this from causing divergence during training. It has also been found to improve model performance to include a generative slicing surjection as described herein to increase a number of input channels, e.g., from 1 layer (greyscale) or 3 layers (colour images) to a larger number N, e.g., $N \geq 5$. The model can also for example include a densely connected part as described herein after the flattening.

FIG. 6 shows a block-diagram of computer-implemented method 600 of training a model, e.g., an image classifier. The model may be configured to determine a model output from an input instance, e.g., to classify an input image into a class from a set of classes. The method 600 may correspond to an operation of the system 100 of FIG. 1. However, this is not a limitation, in that the method 600 may also be performed using another system, apparatus or device.

The method 800 may comprise, in an operation titled "ACCESS TRAINING DATA", accessing 610 a training dataset. The training dataset may comprise at least one labelled training instances labelled with a model output (e.g., a class) and/or at least one unlabelled training instance.

The method 600 may comprise, in an operation titled "DEFINE INVERSE MODEL", defining 620 an inverse model for the model. The model may comprise a set of transformations. The set of transformations comprising at least one deterministic, non-injective transformation. An inverse of this transformation may be approximated in the inverse model by a stochastic inverse transformation. Instead or in addition, the set of transformations can comprise at least one stochastic transformation with a deterministic inverse transformation.

The method 600 may comprise, in an operation titled "TRAIN MODEL", training 630 the model using a log-likelihood optimization.

As part of training operation 630, the method 600 may comprise, in an operation titled "SELECT TRAINING INSTANCE", selecting 632 a training instance from the training dataset.

As part of training operation 630, the method 600 may further comprise, in an operation titled "APPLY MODEL TO INSTANCE", applying 634 the model to the training instance. This may comprise applying the transformation to transformation inputs of the transformation to obtain transformation outputs of the transformation.

As part of the training operation 630, the method 600 may further comprise, in an operation titled "DETERMINE LIKELIHOOD CONTRIBUTION", determining 636 a likelihood contribution for the transformation. For a deterministic, non-injective transformation, this contribution may be based on a probability that the stochastic inverse transformation generates the transformation inputs of the transformation given the transformation outputs of the transformation. For a stochastic transformation with a deterministic inverse, it may be based on a probability that the stochastic transformation generates the transformation outputs given the transformation inputs.

As part of the training operation 630, if the training instance is labelled, the method 600 may comprise, in an operation titled "DETERMINE JOINT LOG-LIKELIHOOD", using the determined likelihood contribution to determine 638 a log-likelihood for the labelled training instance and its label according to a joint probability distribution of input instances and classes determined by the image classifier.

As part of the training operation 630, if the training instance is unlabelled, the method 600 may comprise, in an operation titled "DETERMINE LOG-LIKELIHOOD", using the determined likelihood contribution to determine 639 a log-likelihood for the unlabelled training instance according to a probability distribution of input instances being generated by the inverse model.

The various steps 632-639 of training operation 630 may be performed one or more times to train the model, e.g., for a fixed number of iterations and/or until convergence.

FIG. 7 shows a block-diagram of computer-implemented method 700 of using a trained model, e.g., an image classifier. The model may be configured to determine a model output from an input instance, e.g., to classify an input image into a class from a set of classes. The method 700 may correspond to an operation of the system 200 of FIG. 2. However, this is not a limitation, in that the method 700 may also be performed using another system, apparatus or device.

The method 700 may comprise, in an operation titled "ACCESS MODEL DATA", accessing 710 model data representing the trained model. The model may have been trained according to a method described herein. If the model is used to determine a model output, the model data comprises at least parameters of forward transformations of the trained model, but need not comprise parameters of inverse transformations. If the model is used to generate a model input, the model data comprises at least parameters of inverse transformations but need not comprise parameters of forward transformations.

The method 700 may further comprise using the trained model.

The trained model may be used by, in an operation titled "OBTAIN INPUT INSTANCE", obtaining 720 an input instance, and then in an operation titled "APPLY MODEL TO INSTANCE", applying 722 the model to the input instance, e.g., to classify an input image into a class from a set of classes.

Instead or in addition to operations 720, the trained model may be used by, in an operation titled "APPLY INVERSE MODEL", applying 730 the inverse model for the trained model to generate a synthetic input instance, e.g., a synthetic image. This may comprise, for example, sampling transformation inputs of a deterministic and non-injective transformation of the trained model based on transformation outputs of said transformation according to a stochastic inverse transformation.

It will be appreciated that, in general, the operations of method 600 of FIG. 6 and method 700 of FIG. 7 may be performed in any suitable order, e.g., consecutively, simultaneously, or a combination thereof, subject to, where applicable, a particular order being necessitated, e.g., by input/output relations. Some or all of the methods may also be combined, e.g., method 700 of using a trained model may be applied subsequently to this model being trained according to method 600.

The method(s) may be implemented on a computer as a computer implemented method, as dedicated hardware, or as a combination of both. As also illustrated in FIG. 8, instructions for the computer, e.g., executable code, may be stored on a computer readable medium 800, e.g., in the form of a series 810 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 8 shows an optical disc 800. Alternatively, the computer readable medium 800 may comprise transitory or non-transitory data 810 representing model data representing a model trained according to a method described herein, in particular, model data providing parameters of forward transformations for applying the model to an input instance to obtain a model output, and/or model data providing parameters of inverse transformations for using the inverse model of the model to generate an input instance. The model data may comprise parameters of respective transformations of the model, and may indicate the type of respective transformations, e.g., inference surjective, generative surjective, bijective, or stochastic.

Examples, embodiments or optional features, whether indicated as non-limiting or not, are not to be understood as limiting the present invention.

It should be noted that the above-mentioned embodiments illustrate rather than limit the present invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In a device described as including several means, several of these means may be embodied by one and the same item of hardware. The mere fact that certain measures are described separately does not indicate that a combination of these measures cannot be used to advantage.

What is claimed is:

1. A computer-implemented method of training an image classifier, the image classifier being configured to classify an input image into a class from a set of classes, the method comprising the following steps:
accessing a training dataset, the training dataset including at least one labelled training image labelled with a training class from the set of classes and at least one unlabelled training image;
defining an inverse model for the image classifier, the inverse model configured to map output classes of the image classifier to input images, wherein the image classifier includes a set of transformations, the set of transformations including at least one deterministic and non-injective transformation, an inverse of the deterministic and non-injective transformation being approximated in the inverse model by a stochastic inverse transformation, the inverse model including trainable parameters, and sharing a plurality of the trainable parameters with the image classifier;
training the image classifier using a log-likelihood optimization, the training including:
selecting a training image from the training dataset,
applying the image classifier to the training image, including applying the deterministic and non-injective transformation to transformation inputs of the deterministic and non-injective transformation to obtain transformation outputs of the deterministic and non-injective transformation,
determining a likelihood contribution for the deterministic and non-injective transformation of the image classifier based on a probability that the stochastic inverse transformation of the inverse model generates the transformation inputs given the transformation outputs,
when the training image is the labelled training image, using the likelihood contribution to determine a log-likelihood for the labelled training image and its label according to a joint probability distribution of input images and classes determined by the image classifier,
when the training image is the unlabelled training image, using the determined likelihood contribution to determine a log-likelihood for the unlabelled training image according to a probability distribution of input images being generated by the inverse model; and
optimizing parameters of the image classifier to maximize the log-likelihood for the labelled training image occurring according to the joint probability distribution and optimizing parameters of the inverse model to maximize the log-likelihood for the unlabelled training image for the unlabelled training image occurring according to the probability distribution of input images being generated by the inverse model.

2. The method of claim 1, wherein the determining of the log-likelihood for the training image includes determining a sum of likelihood contributions for respective transformations of the set of transformations.

3. The method of claim 2, wherein the image classifier includes a densely connected component given by a linear bijective transformation and a slicing transformation, wherein the slicing transformation is configured to select a subset of outputs of the linear bijective transformation, wherein an inverse of the slicing transformation is approximated in the inverse model by a stochastic inverse transformation configured to sample non-selected outputs for the linear bijective transformation based on the selected outputs of the linear bijective transformation.

4. The method of claim 2, wherein the image classifier includes a coupling transformation configured to determine first and second transformation outputs given first and second transformation inputs by combining the first transformation input with a first function of the second transformation input to obtain the first transformation output, and combining the second transformation input with a second function of the first transformation output, wherein the first and second functions are convolutions.

5. The method of claim 1, wherein the image classifier includes a max pooling transformation computing a transformation output as a maximum of multiple transformation inputs, wherein an inverse of the max pooling transformation is approximated in the inverse model by an inverse transformation configured to sample an index of a maximal transformation input and values of non-maximal transformation inputs.

6. The method of claim 1, wherein the image classifier includes a ReLU transformation configured to compute a transformation output by mapping a transformation input from an interval to a constant, wherein an inverse of the ReLU transformation is approximated in the inverse model by an inverse transformation configured to, given a transformation output equal to the given constant, sample a transformation input from the given interval.

7. The method of claim 1, wherein the image classifier is configured to classify the input image into the class by determining a vector of class probabilities for respective classes, and, in an output layer, determining the class from the vector, wherein an inverse of the output layer is approximated in the inverse model based on a conditional probability distribution for the vector of class probabilities given the determined class.

8. The method of claim 1, wherein the image classifier further includes a stochastic transformation with a deterministic inverse transformation, and the method further comprises computing a likelihood contribution of the stochastic transformation based on a probability that the deterministic and non-injective transformation generates the transformation outputs of the stochastic transformation given the transformation inputs of the stochastic transformation.

9. The method of claim 1, further comprising:
obtaining an input image data using a sensor of an at least semi-autonomous vehicle;
classifying the input image data using the trained image classifier, including applying the trained image classifier to classify the input image into a class from the set of classes; and
controlling steering and/or braking of the vehicle based on the classification of the input image data.

10. The method of claim 1, further comprising:
obtaining a target class;
applying the trained inverse model to the target class to generate, using the trained inverse model, multiple synthetic images representative of the target class; and
further training the trained image classifier using the generated synthetic images.

11. The method of claim 1, further comprising:
obtaining a target class;
applying the trained inverse model to the target class to generate, using the trained inverse model, multiple synthetic images representative of the target class; and
training a machine learning model using the generated synthetic images.

12. A computer-implemented method of using a trained image classifier, the trained image classifier being configured to classify an input image into a class from a set of classes, the method comprising the following steps:
accessing model data representing the trained image classifier, wherein the image classifier is trained by:
accessing a training dataset, the training dataset including at least one labelled training image labelled with a training class from the set of classes and at least one unlabelled training image,
defining an inverse model for the image classifier, the inverse model configured to map output classes of the image classifier to input images, wherein the image classifier includes a set of transformations, the set of transformations including at least one deterministic and non-injective transformation, an inverse of the deterministic and non-injective transformation being approximated in the inverse model by a stochastic inverse transformation, the inverse model including trainable parameters, and sharing a plurality of the trainable parameters with the image classifier,
training the image classifier using a log-likelihood optimization, the training including:
selecting a training image from the training dataset,
applying the image classifier to the training image, including applying the deterministic and non-injective transformation to transformation inputs of the deterministic and non-injective transformation to obtain transformation outputs of the deterministic and non-injective transformation,
determining a likelihood contribution for the deterministic and non-injective transformation of the image classifier based on a probability that the stochastic inverse transformation of the inverse model generates the transformation inputs given the transformation outputs,
when the training image is the labelled training image, using the likelihood contribution to determine a log-likelihood for the labelled training image and its label according to a joint probability distribution of input images and classes determined by the image classifier,
when the training image is the unlabelled training image, using the determined likelihood contribution to determine a log-likelihood for the unlabelled training image according to a probability distribution of input images being generated by the inverse model, and
optimizing parameters of the image classifier to maximize the log-likelihood for the labelled training image occurring according to the joint probability distribution and optimizing parameters of the inverse model to maximize the log-likelihood for the unlabelled training image for the unlabelled training image occurring according to the probability distribution of input images being generated by the inverse model;
using the trained image classifier by:
obtaining an input image and applying the trained image classifier to classify the input image into a class from the set of classes, and/or
applying the inverse model for the trained image classifier to generate a synthetic image, including sampling transformation inputs of the deterministic and non-injective transformation of the trained model based on transformation outputs of the deterministic and non-injective transformation according to the stochastic inverse transformation.

13. The method of claim 12, further comprising obtaining a target class, and applying the inverse model based on the target class to generate a synthetic image representative of the target class.

14. The method of claim 12, further comprising generating multiple images by applying the inverse model, and using the generated images as training and/or test data to train a machine learning model.

15. The method of claim 12, wherein the image classifier is further configured to determine a confidence score of the classification into the class.

16. A system for training an image classifier, the image classifier being configured to classify an input image into a class from a set of classes, the system comprising:

a data interface configured to access a training dataset, the training dataset including at least one labelled training image labelled with a training class from the set of classes and at least one unlabelled training image;
a processor subsystem configured to:
define an inverse model for the image classifier, the inverse model configured to map output classes of the image classifier to input images, wherein the image classifier includes a set of transformations, the set of transformations comprising at least one deterministic and non-injective transformation, an inverse of the deterministic and non-injective transformation being approximated in the inverse model by a stochastic inverse transformation, the inverse model including trainable parameters parameters, and sharing a plurality of the trainable parambers with the image classifier;
train the image classifier using a log-likelihood optimization, the training including:
selecting a training image from the training dataset;
applying the image classifier to the training image, including applying the deterministic and non-injective transformation to transformation inputs of the deterministic and non-injective transformation to obtain transformation outputs of the deterministic and non-injective transformation;
determining a likelihood contribution for the deterministic and non-injective transformation of the image classifier based on a probability that the stochastic inverse transformation of the inverse model generates the transformation inputs given the transformation outputs;
when the training image is a labelled training image, using the determined likelihood contribution to determine a log-likelihood for the labelled training image and its label according to a joint probability distribution of input images and classes determined by the image classifier;
when the training image is an unlabelled training image, using the determined likelihood contribution to determine a log-likelihood for the unlabelled training image according to a probability distribution of input images being generated by the inverse model; and
optimizing parameters of the image classifier to maximize the log-likelihood for the labelled training image occurring according to the joint probability distribution and optimizing parameters of the inverse model to maximize the log-likelihood for the unlabelled training image for the unlabelled training image occurring according to the probability distribution of input images being generated by the inverse model.

17. A system for using a trained image classifier, the trained image classifier being configured to classify an input image into a class from a set of classes, the system comprising:
a data interface configured to access model data representing the trained image classifier, wherein the image classifier is trained by:
accessing a training dataset, the training dataset including at least one labelled training image labelled with a training class from the set of classes and at least one unlabelled training image;
defining an inverse model for the image classifier, the inverse model configured to map output classes of the image classifier to input images, wherein the image classifier includes a set of transformations, the set of transformations including at least one deterministic and non-injective transformation, an inverse of the deterministic and non-injective transformation being approximated in the inverse model by a stochastic inverse transformation, the inverse model including trainable parameters, and sharing a plurality of the trainable parameter with the image classifier;
training the image classifier using a log-likelihood optimization, the training including:
selecting a training image from the training dataset,
applying the image classifier to the training image, including applying the deterministic and non-injective transformation to transformation inputs of the deterministic and non-injective transformation to obtain transformation outputs of the deterministic and non-injective transformation,
determining a likelihood contribution for the deterministic and non-injective transformation of the image classifier based on a probability that the stochastic inverse transformation of the inverse model generates the transformation inputs given the transformation outputs,
when the training image is the labelled training image, using the likelihood contribution to determine a log-likelihood for the labelled training image and its label according to a joint probability distribution of input images and classes determined by the image classifier,
when the training image is the unlabelled training image, using the determined likelihood contribution to determine a log-likelihood for the unlabelled training image according to a probability distribution of input images being generated by the inverse model, and
optimizing parameters of the image classifier to maximize the log-likelihood for the labelled training image occurring according to the joint probability distribution and optimizing parameters of the inverse model to maximize the log-likelihood for the unlabelled training image for the unlabelled training image occurring according to the probability distribution of input images being generated by the inverse model; and
a processor subsystem configured to use the trained image classifier by:
obtaining an input image and applying the trained image classifier to classify the input image into a class from the set of classes, and/or
applying the inverse model for the trained image classifier to generate a synthetic image, including sampling transformation inputs of the deterministic and non-injective transformation of the trained model based on transformation outputs of the deterministic and non-injective transformation according to a stochastic inverse transformation.

18. A non-transitory computer-readable medium on which is stored instructions training an image classifier, the image classifier being configured to classify an input image into a class from a set of classes, the instructions, when executed by a processor system, causing the processor system to perform the following steps:
accessing a training dataset, the training dataset including at least one labelled training image labelled with a training class from the set of classes and at least one unlabelled training image;

defining an inverse model for the image classifier, the inverse model configured to map output classes of the image classifier to input images, wherein the image classifier includes a set of transformations, the set of transformations including at least one deterministic and non-injective transformation, an inverse of the deterministic and non-injective transformation being approximated in the inverse model by a stochastic inverse transformation, the inverse model including trainable parameters, and sharing a plurality of trainable parameters with the image classifier;

training the image classifier using a log-likelihood optimization, the training including:

selecting a training image from the training dataset, applying the image classifier to the training image, including applying the deterministic and non-injective transformation to transformation inputs of the deterministic and non-injective transformation to obtain transformation outputs of the deterministic and non-injective transformation, determining a likelihood contribution for the deterministic and non-injective transformation of the image classifier based on a probability that the stochastic inverse transformation of the inverse model generates the transformation inputs given the transformation outputs, when the training image is the labelled training image, using the likelihood contribution to determine a log-likelihood for the labelled training image and its label according to a joint probability distribution of input images and classes determined by the image classifier, when the training image is the unlabelled training image, using the determined likelihood contribution to determine a log-likelihood for the unlabelled training image according to a probability distribution of input images being generated by the inverse model, and optimizing parameters of the image classifier to maximize the log-likelihood for the labelled training image occurring according to the joint probability distribution and optimizing parameters of the inverse model to maximize the log-likelihood for the unlabelled training image for the unlabelled training image occurring according to the probability distribution of input images being generated by the inverse model.

\* \* \* \* \*